United States Patent [19]

Zimmerman et al.

[11] Patent Number: 5,112,909
[45] Date of Patent: May 12, 1992

[54] BLENDS OF POLYMERS PARTICULARLY POLYCARBONATES ACRYLATE-MODIFIED RUBBER COMPOSITIONS AND ADDITIONAL POLYACRYLATES

[75] Inventors: Daniel D. Zimmerman, Stratford; Gary Vieiro, West Haven, both of Conn.

[73] Assignee: Cyro Industries, Mt. Arlington, N.J.

[21] Appl. No.: 686,294

[22] Filed: Apr. 16, 1991

Related U.S. Application Data

[63] Continuation of Ser. No. 348,451, May 4, 1989, abandoned, which is a continuation-in-part of Ser. No. 220,868, Jul. 18, 1988, abandoned.

[51] Int. Cl.$^5$ .................. C08L 33/12; C08L 69/00; C08L 51/04; C08L 27/06
[52] U.S. Cl. ............................ 525/67; 525/64; 525/66; 525/71; 525/75; 525/80; 525/84
[58] Field of Search .................. 525/67, 75, 80, 84

[56] References Cited

U.S. PATENT DOCUMENTS

| | | | |
|---|---|---|---|
| 4,419,491 | 12/1983 | Sakano | 525/67 |
| 4,461,868 | 7/1984 | Lindner | 525/67 |
| 4,550,138 | 10/1985 | Paddock | 525/67 |
| 4,656,225 | 4/1987 | Boutni | 525/67 |
| 4,788,250 | 11/1988 | Kitahara | 525/67 |

Primary Examiner—John C. Bleutge
Assistant Examiner—David Buttner
Attorney, Agent, or Firm—William H. Calnan

[57] ABSTRACT

Modified rubber compositions comprise, by weight, about 15-60% of a highly saturated aliphatic rubber, such as ethylene-propylene-diene rubber, about 25-80% of preferably non-nitrogenous acrylate monomer units; and less than about 5% multi-functional monomer units. The compositions exist as amorphous heterogeneously dispersed phases. The first phase comprises the copolymer rubber, to which polymers of at least 10%, preferably 20%, and more preferably 30% of the other monomer units are grafted. The second phase comprises the other monomers polymerized as homo and copolymers, not grafted to the rubber.

The modified rubber composition, preferably non-nitrogenous polyacrylate polymer, and another polymer are mixed together to form a polymer blend having higher impact strength and other important properties.

9 Claims, 17 Drawing Sheets

BLENDS OF POLYMERS PARTICULARLY POLYCARBONATES ACRYLATE-MODIFIED RUBBER COMPOSITIONS AND ADDITIONAL POLYACRYLATES

RELATED APPLICATIONS

This is a continuation of co-pending application Ser. No. 07/348,451, filed on May 4, 1989, now abandoned, which is a continuation-in-part of copending application Ser. No. 07/220,868, filed on Jul. 18, 1988, now abandoned.

TECHNICAL FIELD

This invention relates to polymer blends of acrylate modified graft, highly saturated, rubber compositions, additional polyacrylate-, particularly where the acrylates are non-nitrogenous-, and other polymers—particularly polycarbonates, and to methods of manufacturing such products The invention further relates to the manufacture of modified rubber compositions, and the use of said compositions, together with additional polyacrylates as strengtheners/extenders in more expensive polymers, particularly polycarbonates.

BACKGROUND ART

In our above-identified application, we disclosed how the addition of saturated rubbers; for example, ethylene-propylene copolymers or hydrogenated polyisoprene, modified by grafting acrylates thereto, could when added to polymethylmethacrylate or other acrylates provide weatherable, impact resistant polyacrylate products.

Many polymers, such as polycarbonates, used in engineering applications are tough, but difficult to process and expensive. It is desirable that such high cost polymers be extended without reducing their toughness by blending them with less expensive polymers, and also to increase their processability.

According to the prior art, the brittleness of polycarbonate in thick sections may be reduced by the addition of a modified rubber composition.

U.S. Pat. No. 4,419,491 entitled THERMOPLASTIC RESIN COMPOSITION EXCELLENT IN COLOR DEVELOPMENT, issued Dec. 6, 1983 to Sakano et al discloses blends of styrene acrylonitrile (SAN) modified EPDM, SAN copolymers, methylmethacrylate polymers, and polycarbonate resin blends. We have discovered that the use of acrylonitrile, a nitrogenous acrylate, produces much inferior results than blends where the EPDM is modified with a non-nitrogenous acrylate.

We have further discovered that polycarbonates extended with a modified polymer graft rubber compositions, such as disclosed in U.S. Pat. No. 4,456,725, issued Jun. 26, 1984 to Liu et al entitled COMPOSITIONS COMPRISING POLYCARBONATES, ACRYLATE RESINS, AND ALIPHATIC HYDROCARBONS, and in U.S. Pat. No. 4,638,033, issued Jan. 20, 1987 to Boutni et al entitled RESINOUS COMPOSITION OF A CARBONATE RESIN AND A GRAFTED DERIVATIVE OF ETHYLENEPROPYLENE-DIENE TERPOLYMER EXHIBITING IMPROVED RESISTANCE TO ORGANIC SOLVENTS, utilizing nitrogenous acrylates in the blends did not exhibit the high strength qualities of the blends we have discovered comprising a non-nitrogenous polyacrylate polymer.

DISCLOSURE OF THE INVENTION

We have discovered that an acrylate (particularly a non-nitrogenous acrylate) modified polymer graft highly saturated rubber composition and additional polyacrylate (particularly a non-nitrogenous acrylate) polymer can be blended with other polymers (particularly polycarbonates) to reduce the cost of the final product, to improve the impact strength of the final product, to increase the weatherability of the final product, and to increase the processability of the final product from that of the other polymer.

We have found that non-nitrogenous acrylate modified rubber compositions work better in polycarbonate, modifier, PMMA blends than nitrogenous acrylate modified rubber composition, such as styrene acrylonitrile (SAN), EPDM disclosed in the above-identified Sakano et al patent.

Our polycarbonate containing blends preferably comprise 35 to 65% additional polyacrylate. The proportion of rubber used to form the graft rubber composition to the total graft rubber composition and polyacrylate polymer in our polycarbonate containing blends is in the range of approximately 2 to less than 30% by weight and preferably no greater than 25%. Modified rubber composition is present in the polycarbonate containing blends in the range of approximately 6 to 50% by weight. The acrylate used in the modified rubber composition has a number average molecular weight upon grafting of less than 80,000 daltons while the polyacrylate added to the blend preferably has a much higher number average molecular weight, greater than 80,000 daltons.

Blends of the modifier, additional acrylate polymer and non-polycarbonates, which we have found have useful properties, include: SAN, polystyrene, PVC, polypropylene, polyester, styrene maleic anhydride, chlorinated polyethylene, polyethylene terephthalate, nylon and ABS.

OBJECTS OF THE INVENTION

It is therefore among the objects of the invention to provide polymer blends comprising a modifier, a polyacrylate, and another polymer (particularly polycarbonate); with improved impact resistance, weatherability, increased processing flexibility, or reduced cost. Another object of the invention is to provide such polymer blends where the extended polymer is a polyacrylate that is less expensive than the other polymer employed.

Other objects of the invention will in part be obvious and will in part appear hereinafter. The invention accordingly comprises products, compositions of matter, and methods—all possessing features, properties, ingredients, and characteristics, and the several steps and the relation of one or more such steps with respect to each of the others, which will be exemplified in the products, compositions, and methods hereinafter disclosed. The scope of the invention will be indicated in the claims.

DESCRIPTION OF THE DRAWINGS

For a fuller understanding of the nature and objects of the invention, reference should be had to the following detailed description taken in connection with the accompanying drawings in which.

The same reference characters refer to the same elements throughout the several views of the drawings.

BEST MODE FOR CARRYING OUT THE INVENTION

Figure 1:
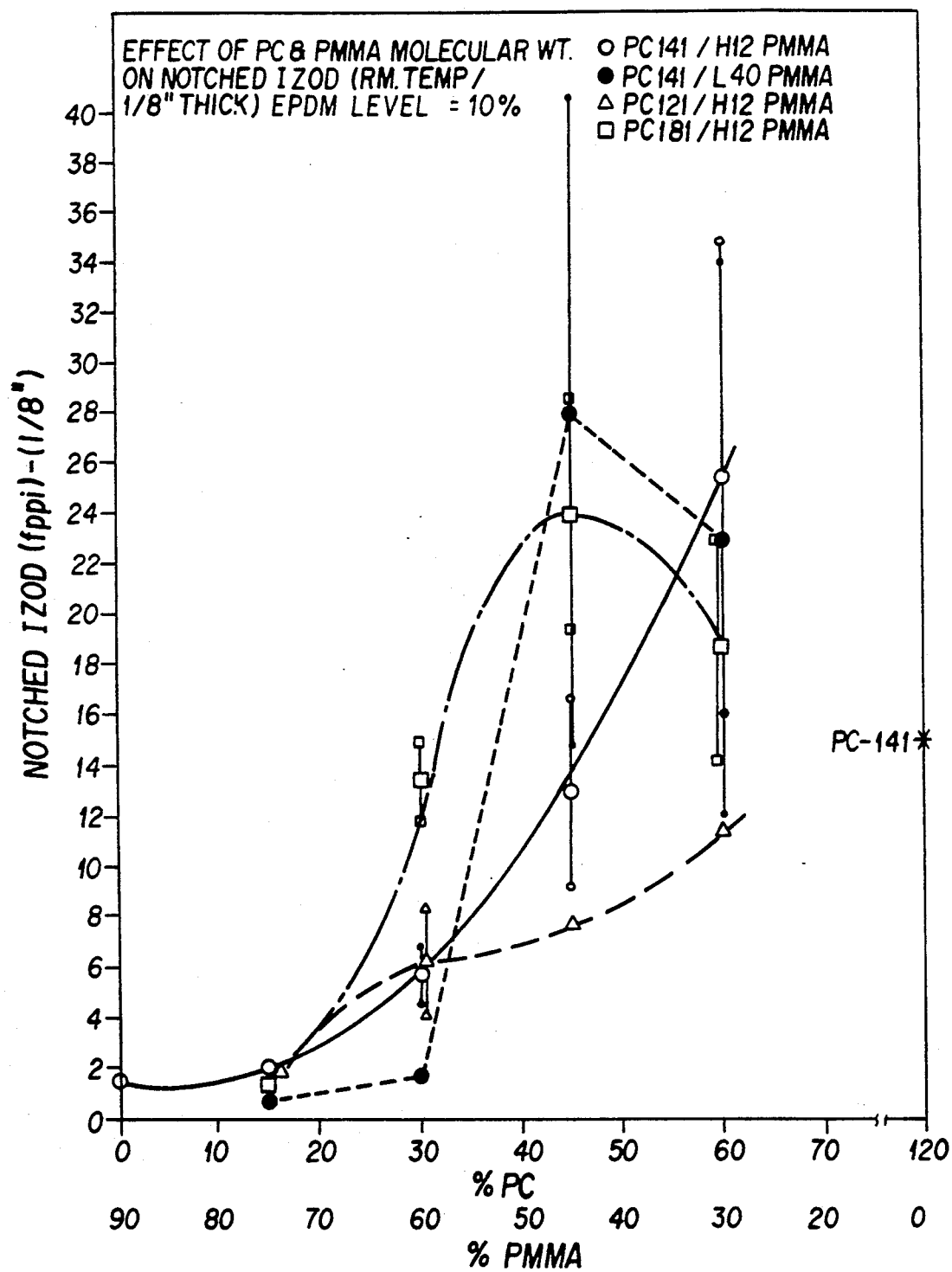
FIG. 1 is a graph of notched Izod impact (at room temperature, ⅛" thick piece) versus relative percentages of polycarbonate and PMMA in blends according to the invention utilizing polycarbonate and PMMA of differing molecular weights.

The novel, modified rubber compositions used in the blends of the present invention are produced as described in our above-identified co-pending U.S. Application by a) dissolving an aliphatic rubber containing a low level of unsaturation (i.e. a highly saturated rubber) in an organic solvent, b) grafting onto said rubber a mixture mainly of acrylate monomers but also optionally including one or more monomers and c) drying said modified rubber system.

Preparation of Blends

Various blends of the modified rubber composition, polyacrylates, and other polymers are obtained by tumble blending the particulate components and extruding them through a 30 mm Leistritz ® twin screw extruder. Temperatures in the extruder are set at 450° F. across the board, and the screw rotation is held at 100 RPM. Under these conditions, the average residence time in the extruder is less than 2.5 minutes. Actual melt temperatures are generally in the 470°–510° F. range. The strands from the Leistritz ® are water cooled, pelletized and dried prior to injection molding.

The pellets are injection molded in a 75 ton New Britain ® injection molding machine. The mold temperature is set at 150° C. When molding polycarbonate, the 3 zones in the molding machine are set at 480° to 510° F. depending on the levels of PC present, with the higher levels used at higher PC levels. Similarly, injection pressures are set at 600–1,000 psi. Injection speed used is medium to fast. Cycle times for the various shapes molded are less than one minute.

Rubbers

The aliphatic rubbers which can be used include materials bearing a highly saturated main chain (i.e. with less than 1%, preferably less than 0.1%, carbon-carbon double bonds in the main chain) and having side chains containing more than 0.1% carbon-carbon double bonds. Examples of such aliphatic rubbers are ethylene-propylene-diene rubbers (EPDM), ethylene-propylene-triene rubbers (EPTM), vinyl groups containing polysiloxanes, and the like. Illustrative are materials such as Copolymer Rubber and Chemical Corporation's Epsyn ® family of ethylene-propylene-diene rubbers and Polysar ®, ethylene-propylene-diene rubbers from Polysar, Ltd. These rubbers are copolymers containing mainly ethylene and propylene monomer units and small amounts of norbornene-containing monomer units. In this patent, the term "copolymer" refers to any polymeric material containing more than one kind of monomer unit. The norbornene monomer contains an olefinic moiety which remains intact in the ethylene-propylene-diene rubber. The olefin content and thus the level of unsaturation is controlled by the level of norbornene monomer in the copolymer rubber. The level of unsaturation desired according to this invention is from about 2 to about 30 olefinic groups per 1000 carbon atoms. More preferred is a level of unsaturation of about 5 to about 15 olefinic per 1000 carbon atoms.

Epsyn ® 55 is one example of a commercial material which meets these requirements and works well in this invention. Other aliphatic rubbers which contain low levels of unsaturation that can be used in our invention include, but are not limited to, those supplied by Polysar Ltd. under the trademark Polysar ®. These rubbers have a weight average molecular weight (Mw) greater than about 100,000.

Solvents

Organic solvents that may be used in the invention include materials with low solubility parameters such as benzene, toluene, xylenes, ethylbenzene, chlorobenzene, butylacetate, and the like. Preferred solvents are toluene, chlorobenzene and butylacetate. The solution according to the invention may contain about 10 to about 50 weight percent rubber, preferably from about 5 to about 35% rubber, more preferably about 10 to about 25% rubber.

Grafting

"Grafting" refers to the process of polymerizing one or more monomers in the presence of a polymer or copolymer under conditions where the product is expected to contain branches of the new polymer or copolymer attached to the carbon skeleton of the initial polymer or copolymer. The products obtained from a grafting process are complex mixtures containing oligomers, polymers or copolymers of the monomers, unreacted monomers, unchanged polymers or copolymers and grafted polymers or copolymers.

In a typical grafting reaction, a mixture of a free radical initiator, the desired monomer or monomers and, optionally, an organic solvent is added to the solution of, for example, an aliphatic rubber polymer, under controlled conditions. The temperature is maintained high enough to cause decomposition of the free radical initiator into free radicals which then initiate grafting and polymerization of the monomers.

In order to obtain maximum performance, it is essential to carefully control the grafting process.

First, it is important that the monomers actually become chemically bonded to the rubber, i.e. that relatively high grafting efficiency be obtained. This is especially challenging when saturated rubbers are used. Since the grafting is always carried out in the presence of monomers and initiator, formation of copolymers which are not grafted to the rubber is always a competing process. These nongrafted homo- and copolymers are generally not removed from the product and can actually reduce the clarity and impact resistance of the final rubber modified PMMA products. In this process, grafting efficiency should exceed about 10%, preferably 20%, and most preferably 30%.

Second, the number average molecular weight (e,ovs/M/ $_N$) of the grafted chains and the ungrafted copolymers must be relatively high—greater than about 10,000 g/mole, preferably greater than 20,000 g/mole, and most preferably close to 40,000 g/mole.

We have not found it necessary to go to very high molecular weights, e.g. greater than 80,000 g/mole.

The determination of the molecular weight of chains grafted onto rubber is based on the assumption that grafted chains and ungrafted chains formed separately by the same process have approximately the same molecular weight.

Third, to allow uniform mixing of the modified rubber composition with additional PMMA, the amount of crosslinking must be kept low. In contrast to a variety of other processes in which highly crosslinked rubber particles are used to stabilize brittle polymers, our modified rubber composition does not appear to contain discrete rubber particles until after it has been blended with PMMA. Rather, it comprises two, amorphous, heterogenously dispersed phases. This provides a distinct advantage for this composition since it is not necessary to create discrete stable particles in the initial process. Rather, processing and blending conditions can be optimized to create the desired particles when the modified rubber composition is blended with additional PMMA and other polymers.

Our process is sufficiently general so that discreet, crosslinked rubber particles may be generated, for example, by the addition of crosslinking agents during the grafting process, if desired. Addition of crosslinking agents is particularly preferred when EPDM dispersions have been generated.

Of course, if refractive index matching by grafting is not desired, the phenyl may be omitted. In order to increase the compatibility of the rubber particles with the PMMA in the finished product, the grafted acrylate polymer should be concentrated at the ends of the graft chains.

Thus, the modified rubber compositions used in the invention have a high grafting efficiency, relatively high molecular weight graft chains (10,000 to 80,000 daltons), a low level of crosslinking (if any) and a controlled chemical composition in which the high refractive index monomer units (if any) are concentrated at the head end of the graft chains attached to the highly saturated rubber backbone.

The free radical initiator can be selected from the wide variety of commercially available non-azo initiators which are well known in the art. Preferred initiators include peroxy compounds, e.g. benzoyl peroxide, monoperoxycarbonate, cumyl peroxide, di-t-butyl peroxide, t-butyl peroctoate, and the like.

The concentration of initiator can range between about 0.1 to about 5 parts per hundred parts of rubber. The preferred concentration is between about 0.5 to about 2.5 parts per hundred parts of rubber. The solvent is selected from the group already described and is usually identical to the solvent in which the rubber has been dissolved. No solvent is necessary. When a solvent is used for processing considerations, it is used in quantities ranging between about 100 and about 2000 parts per hundred parts of rubber, preferably over the range of about 100 to about 750 parts per hundred parts of rubber.

Grafting Step

The mixture of monomers, initiator and solvent is added to a heated, agitated solution of the rubber and, optionally, a fluorine containing polymer or the block copolymer, or both. The grafting is carried out at a temperature which is at least sufficient to convert the initiator into free radicals. Useful temperatures range between about 50° C. and about 200° C., preferably from about 65° C. to about 130° C. The solution of rubber and added monomer can be agitated by any convenient means which allows thorough mixing throughout the addition of the monomers and, preferably, throughout the reaction. The reaction is allowed to occur for sufficient time for the conversion of monomers to polymer to exceed about 50%, and preferably to exceed about 70%.

The product of this first grafting step, hereafter referred to as the "phenyl graft", can be isolated and dried but is preferably used without modification in the acrylate grafting step.

The acrylate monomers grafting step is performed in a manner similar to that of the phenyl grafting procedure. A solution of the desired monomers, a free radical initiator and, optionally, a solvent is added to the phenyl graft solution under conditions which are expected to produce some grafting.

The monomers are selected to make the graft polymer compatible with the bulk polyacrylates with which the modified rubber composition will be blended. The monomers are of the same general family as the final polyacrylate products:

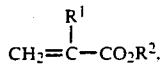

where $R^1$ is H or an alkyl or aryl group containing less than about 9 carbon atoms and $R^2$ is an alkyl or aryl group containing less than about 9 carbon atoms. Aliphatic groups containing less than 4 carbon atoms are preferred. The monomers can be used alone or in mixtures.

The acrylates are selected such that the dynamic glass transition temperature, $T_{max}$, of a homo- or copolymer consisting of said acrylates should be in the range of from 50° C. to 170° C. Preferably, 70-100% by weight, more preferably 80 to 99% by weight, of the total monomers is methylmethacrylate.

The free radical initiator can be chosen from those known in the art to (a) catalyze the polymerization of methylmethacrylate, and also (b) abstract hydrogen from highly saturated rubbers to initiate grafting. Preferred initiators are peroxy compounds including, but not limited to, benzoyl peroxide, monoperoxycarbonate, di-t-butyl peroxide, cumyl peroxide, t-butyl-peroctoate, and the like.

The solvent meets the criteria described above. No solvent is necessary. When a solvent is used for processing reasons, it is used in quantities ranging from about 100 to about 2000 parts per hundred parts of rubber, preferably about 100 to about 750 parts per hundred parts of rubber.

The useful temperature range is between about 50° C. and about 200° C., preferably between about 65° C. and about 130° C. The solution can be agitated by any convenient means which allows thorough mixing throughout the period of addition of the monomers to the phenyl graft The reaction is allowed to proceed until the conversion exceeds about 50% and, preferably, exceeds about 70%.

This grafting procedure may be carried out in one step or in a series of steps, for example, to incorporate different levels of methylacrylate in a series of grafting steps.

A multifunctional monomer may be added at a low level at any step in the process to increase graft molecular weight with minimal crosslinking of the graft network. Typical multifunctional monomers include divinyl benzene, tris allyl isocyanurate, and the like.

The modified rubber product can then be dried in any convenient manner. One convenient lab process involves air drying the product for about 12 to about 24 hours followed by removal of any remaining solvent in vacuo. A preferred process involves continuous devolatilization in an extruder.

The process can be conducted as either a batch or a continuous system. The product is then stored and shipped to the place of manufacture of polyacrylate products.

The modified rubber composition is then blended with polyacrylates and another polymer. The polyalkylacrylate comprises greater than about 90% of monomer units of the structure

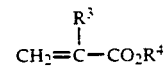

wherein $R^3$ is selected from the group consisting of H and an alkyl group, and $R^4$ is selected from the group consisting of an alkyl group, and an aryl group; said groups each comprising less than about 9 carbon atoms, in particular with polymethylmethacrylate.

EXAMPLE 1

The modified rubber particulate product is preferably manufactured as follows: 50 g (gram), 33 pphr (parts per hundred parts of rubber) styrene (Sty); 60 g, 40 pphr methylmethacrylate (MMA); 1 g, 0.7 pphr methylacrylate (MA) and 2.4 g, 1.6 pphr benzoyl peroxide (B.P.) initiator (Init) are combined and placed in a graduated addition funnel. The solution is purged with nitrogen. One half of this solution is added in a slow stream over a 5-10 minute period to a stirred solution of 150 g of ethylene-propylene-diene rubber (EPDM) such as Epsyn ® 55 rubber dissolved in 900 g toluene (Tol) at 75° C. under a nitrogen atmosphere. The remainder of the styrene containing solution is added dropwise to the stirred rubber solution over 2 hours. The resulting solution is stirred and maintained at 75° C. for an additional 14 hours. At this stage, at least 65% of the monomers have been grafted onto the rubber or converted to styrene methylmethacrylate copolymer.

216 g, 144 pphr methylmethacrylate; 5 g, 3 pphr methylacrylate and 2 g, 1.3 pphr benzoyl peroxide are added to a graduated addition funnel and purged with nitrogen. One half of this mixture is added in a slow stream over 5-10 minutes to the grafted rubber solution prepared above at 80° C. under a nitrogen atmosphere. The remainder of the methylmethacrylate solution is added dropwise over a 2 hour period to the stirred rubber solution. The resulting mixture is allowed to stand for 16 hours. Solvent and unreacted monomers are removed under reduced pressure.

The yield of modified EPDM product is 465 g indicating 95% conversion of monomers to grafted species or copolymers. The product may be produced and stored indefinitely and shipped to the place of manufacture of the polymethylmethacrylate and other polymer blends of the invention.

EXAMPLE 2

A scaled-up modified rubber composition was produced in a pilot plant to demonstrate process feasibility as well as to prepare larger quantities of the modified rubber composition for further evaluation. The EPDM rubber was dissolved in a 72 gallon reactor equipped with a turbine agitator, a temperature controlled jacket and a recirculating loop. Forty two lbs. of Epsyn ® 55 were charged in 261 lbs. of toluene. Dissolution of the rubber was achieved after a few hours at 90° C. but was continued for approximately 10 hours to insure complete solution This EPDM-toluene solution was grafted in a similar reactor, as described above. To the above charge, 13.9 lbs. of styrene, 23.5 lbs. of MMA, 0.3 lbs. of MA, and 0.67 lbs. of benzoyl peroxide were added in a 2 step manner. Half of the reactants were added initially and the other half over a period of 1.5 hours. Temperature during polymerization was maintained at 80°-90° C. and after approximately 10 hours, conversion of the monomers exceeded 50%.

Several batches were prepared so as to maintain an inventory of this material which was subsequently continuously fed into a 15 gallon reactor equipped with a turbine agitator and a temperature controlled jacket. The above material was fed into this second reactor at a 20.5 lbs./hr. rate together with additional monomers consisting of MMA and MA (MMA/MA: 98/2) and a benzoyl peroxide stream in toluene. The monomer rate was 3.7 lbs./hr. and the initiator in toluene rate was (0.03 lbs./hr./$B_2O_2$, 2.72 lbs./hr. of toluene). The total incoming material was 26.9 lbs./hr. Product was withdrawn at the same rate with an average residence time of 2.5 hours at 80°–90° C. and an overall monomer conversion in excess of 60%. The product was then pumped into a 20 gallon cylindrical chamber where additional polymerization took place. No agitation was provided in this reactor which was maintained at 100°–115° C. The product, after an average residence time of 6 hours, had over 90% of the monomers present converted. This product was pumped to a 30mm devolatilizing extruder where the solvent and unreacted monomers were volatilized and condensed and the modified rubber composition extruded into strands which were cooled and pelletized.

EXAMPLE 3

Commecial PC (Lexan ® 141) was injection molded into samples in accordance with the supplier's recommended conditions.

EXAMPLE 4

A blend of 70/30 PC/PMMA (i.e., 70% PC, 30% PMMA, by weight) was prepared on a Leistritz ® twin screw extruder and injection molded as described in Preparation of Blends.

EXAMPLES 5–12

Blends were prepared from modified rubber compositions as described in Example 1 and processed as described in Preparation of Blends.

EXAMPLES 13 and 14

The modified rubber composition procedure described in Example 1 was followed except that 40 pphr of acrylonitrile was used in place of the MMA in the initial polymerization step. All other steps in the preparation of the modified rubber composition and the preparation of the blends were as previously described.

EXAMPLE 15

The modified rubber composition procedure described in Example 1 was followed except that no styrene was used as it was replaced by MMA. All other steps were as previously described.

EXAMPLE 16

The modified rubber composition procedure described in Example 1 was followed except that an additional 27 pphr of styrene was used in the second part of the polymerization procedure. This amounted to the use of 60 pphr of styrene total (rather than 33 pphr of styrene as in the standard procedure). All other steps were as previously described.

EXAMPLE 17

The modified rubber composition procedure described in Example 1 was followed except that polymerization was only allowed to proceed to 48% conversion of the monomers. After removal of unreacted monomers, this resulted in a higher rubber concentration of 49% EPDM. All other steps were as previously described.

EXAMPLE 18

The modified rubber composition described in Example 1 was modified by using twice the amount of MMA/MA used in the second step of the polymerization. The reaction was allowed to proceed to 88% conversion of the monomers. All other steps were as previously described.

EXAMPLE 19

The modified rubber composition described in Example 1 was followed except that alpha-methyl styrene was used in place of styrene. This resulted in a much poorer conversion of only 45% of the monomers present. The resultant 50% EPDM concentration in the modified rubber composition was then used as previously described.

EXAMPLES 20–30

The large scale modifier prepared in Example 2 was used to prepare various blends in which the EPDM rubber, PC, and PMMA levels were varied. All samples were prepared and injection molded as previously described.

EXAMPLES 31–38

Another large scale modifier prepared as in Example 2 was used to prepare various blends in which the rubber level was held constant (i.e. at 10%) but used with different molecular weight PMMA (i.e. CYRO's H-12 and L-40 PMMA). Both of these have molecular weights greater than 100,000 daltons. Their melt flow index at 230° C. and 3.8 kilograms are 7.0 and 29.0, respectively. As will be shown below, the high molecular weight added PMMA (i.e. H-12) blends have superior qualities. Thus, one cannot rely on the low molecular weight PMMA residues in the EPDM graft compositions of Example 1 to provide all of the features of our invention. The addition of the higher molecular weight, above 80,000 daltons, PMMA provides the improved qualities seen in the tests described below. All samples were prepared and injection molded as previously described.

EXAMPLES 39–41

These blends were prepared as above except that a commercially available modifier, i.e. Uniroyal Royalite ® 372 (i.e. EPDM grafted with styrene-acrylonitrile), was used.

EXAMPLES 42–43

These examples are omitted.

EXAMPLES 44–54

Various polymers were blended with our modifier under the conditions described above.

EXAMPLES 55-61

A large scale modifier prepared as in Example 2 was used to prepare Examples 55-61. All samples were prepared as previously described. Examples 58-60 had various stabilizers, i.e. 0.12% UV 5411, 0.16% Cyasorb® 3346, 0.12% Irganox® 1076 and 0.06% Weston® 619, tumble blended together with PC, PMMA and EPDM prior to extrusion. Example 61 used commercial Rovel® 501 in preparing the various comparative samples.

EXAMPLES 62-90

Various polymers were blended with our modifier as prepared in Example 2. These are described in Examples 66-68, 71-73, 75-77, 79-88, and 90-90. Examples 62-65, 69-70, 74, and 78 were controls of prior art polymers and polymer blends.

| Description | Tests Performed Procedure |
|---|---|
| Notched Izod Impact | ASTM D-256 |
| Dart Drop (a measure of resistance to cracking due to a falling weight) | Modified Gardner ASTM D-3029-84 Method G. 4 lb. weight used. Dart Dimensions: 2½" × 0.625" D |
| | D-3523 |

Table 1 illustrates how some of the key properties of these blends are influenced by the relative levels of PC and PMMA. A comparison between PC alone (Example 3) and a blend of PC and PMMA (Example 4) in the absence of the rubber modified composition is included. PC alone has excellent notched Izod in thin parts (i.e. ⅛" thick bar) but much poorer ones in thicker parts (i.e. ¼" thick bar). This thickness sensitivity in the PC behavior is well known. A blend of PC/PMMA shows a dramatic decrease in notched Izod compared to PC alone.

At the same approximate PC/PMMA level (i.e. Example 4 vs. Example 8), the increase in Izods in ¼" bars is dramatic when modifier is added. Note also that, surprisingly, very high notched Izod impacts are also shown in blends which are not predominantly PC. (see, for example, Examples 4, 6 and 7). Also to be noted is the fact that even in thinner bars (i.e. ⅛" thick), some of the blends exhibit better notched Izod impact than PC (i.e. Examples 7, 8) and that the influence of thickness is much less dramatic than in PC alone.

TABLE 1
KEY PROPERTIES OF PMMA/PC/EPDM BLENDS

| | | Notched Izod (fppi) | | | |
|---|---|---|---|---|---|
| | | ¼" bar | | | ⅛" bar |
| | | As is Tested: | Annealed | | |
| Example | Material Composition | Room Temp. | Room Temp. | −20° C. | Room Temp. |
| 3 | Polycarbonate* | 2.5 | 1.7 | 1.7 | 10.2 |
| 4 | PC/PMMA (70:30 wght %)** | 0.5 | — | — | — |
| 5 | PC/PMMA/EPDM*** (30/60/10 wght %) | 4.4 | — | — | — |
| 6 | (44/50/6)*** | 6.6 | 6.4 | 2.8 | 7.8 |
| 7 | (45/45/10)*** | 12.2 | 15.1 | 5.2 | 17.3 |
| 8 | (71/19/10)*** | 12.4 | 10.1 | 8.4 | 10.8 |
| 9 | (13/77/10)*** | 1.3 | 1.2 | 0.9 | 1.3 |
| 10 | (60/30/10)*** | 11.0 | — | — | — |

| | | ASTM D-638 | | | | | Melt |
| Example | Material Composition | Tensile Strength (psi) | Elongation Yield/break (%) | Tensile Modulus (psi) (10⁵) | Deflection Temp. Level DTL (°C.) | Vicat (°C.) | Flow Index M.F.I.# g/10 min |
|---|---|---|---|---|---|---|---|
| 3 | Polycarbonate* | 8,900 | 6.6/50+ | 3.18 | 125,132 | — | — |
| 4 | PC/PMMA (70:30 wght %)** | 10,100 | 5.7/41 | 4.15 | 100 | — | 6.1 |
| 5 | PC/PMMA/EPDM*** (30/60/10 wght %) | 6,900 | 6.0/50+ | 2.77 | 92 | —· | — |
| 6 | (44/50/6)*** | — | — | — | 99 | — | — |
| 7 | (45/45/10)*** | 7,300 | 5.5/50+ | 2.86 | 97 | 131 | 3.9 |
| 8 | (71/19/10)*** | 7,100 | 5.6/50+ | 2.66 | 107 | 141 | 2.1 |
| 9 | (13/77/10)*** | 7,500 | 5.0/40 | 3.22 | 91 | 111 | 8.4 |
| 10 | (60/30/10)*** | 7,200 | 6.6/50+ | — | 101 | — | — |

MFI· 230° C./5000 g (H-12 PMMA at these conditions: 10.2)
*G.E. Lexan ® Polycarbonate 141
**Blend of PC with PMMA
***EPDM as described in example 1 (i.e., 32% EPDM, 10% styrene, 1% MA, 57% MMA).
Blended with Cyro's H-12 PMMA and G.E.'s Lexan ® 141 Polycarbonate.
Weight % of PMMA includes PMMA in rubber graft, as well as added PMMA and weight % of EPDM is % of original EPDM in final compositions in all tables.

| Tensile Tests | ASTM D-638 |
|---|---|
| DTL (Deflection Temperature Level) | ASTM D-648 |
| Vicat (softening temperature) | ASTM D-1525 |
| M.F.I. (Melt Flow Index) | ASTM D-1238 |
| Rockwell Hardness | ASTM D-785 |
| Yellow Index | ASTM D-1000-3 |
| Gloss | Gloss at 60° angle using Glossgard ® as per ASTM |

Table 2 illustrates how some key properties of the PC/PMMA blends are affected by the type of modified rubber composition. Examples 11 and 12 use the standard modifier described in Example 1.

Examples 13 and 14 show that addition of acrylonitrile to the modifier results in substantial lowering of the notched Izod impact of these blends. Thus, it is preferable that the graft be non-nitrogenous.

The absence of styrene (Example 15) or twice the level of styrene normally used (Example 16) shows no dramatic changes in notched Izod. Use of modifier with higher rubber concentrations (Example 17) leads to some lowering of the notched Izod values but still relatively high values. Use of a lower rubber concentration in the modifier (Example 18) does not appear to result in any significant changes in impact behavior. Use of alpha-methyl styrene to replace styrene in the modifier (Example 19) is seen however to dramatically decrease notched Izod properties.

ously noted, very high notched Izod impacts were obtained at levels in which PC was not the dominant phase. The higher levels of PC do however lead to higher heat resistance as shown by their higher Vicat values. Interestingly, at EPDM rubber levels of 20%, impacts actually decreased compared to those obtained with 10 to 15% EPDM rubber level. As would be expected, the higher rubber levels also lead to decreased tensile strength, lower tensile modulus and reduced melt flowability.

TABLE 3

KEY PROPERTIES OF BLENDS#

| EXAMPLE | MATERIAL COMPOSITION (PC/PMMA/EPDM) | NOTCHED IZOD (fppi) | | | | TENSILE STRENGTH (psi) | ELONGATION* @ YIELD (%) | TENSILE MODULUS $\times 10^6$ (PSI) | VICAT (°C.) | MFI** (g/10 min) |
|---|---|---|---|---|---|---|---|---|---|---|
| | | ¼" @ rm temp | ¼" −20° C. | ⅛" @ rm temp | ⅛" −20° C. | | | | | |
| 20 | 32/65/5 | 2.8 | 0.8 | 4.6 | 1.4 | 8600 | 5.0 | 0.4 | 118 | 4.1 |
| 21 | 20/70/10 | 1.6 | 0.9 | 2.0 | 1.0 | 6800 | 4.3 | 0.3 | 111 | 4.4 |
| 22 | 30/60/10 | 5.4 | 2.0 | 8.9 | 3.1 | 7200 | 4.8 | 0.3 | 115 | 2.8 |
| 23 | 45/45/10 | 14.1 | 5.4 | 18.2 | 15.0 | 7100 | 5.1 | 0.3 | 134 | 2.3 |
| 24 | 70/20/10 | 12.4 | 5.9 | 15.0 | 12.5 | 7000 | 5.0 | 0.3 | 140 | 1.4 |
| 25 | 19/66/15 | 3.2 | 1.9 | 4.5 | 2.0 | 5500 | 4.6 | 0.23 | 111 | 3.1 |
| 26 | 28/57/15 | 5.7 | 2.2 | 9.6 | 3.5 | 5700 | 4.9 | 0.24 | 113 | 2.8 |
| 27 | 42.5/42.5/15 | 20.0 | 3.8 | 20.0 | 15.2 | 5800 | 5.2 | 0.23 | 129 | 1.9 |
| 28 | 18/62/20 | 2.4 | 1.7 | 3.4 | 1.9 | 4600 | 4.8 | 0.21 | 109 | 2.1 |
| 29 | 27/53/20 | 3.4 | 1.7 | 9.4 | 2.2 | 4800 | 4.9 | 0.20 | 114 | 1.9 |
| 30 | 40/40/20 | 6.6 | 2.6 | 17.2 | 3.2 | 4300 | 4.8 | 0.20 | 124 | 1.2 |

Cyro's H-12 PMMA and G.E.'s Lexan ® 141 PC used.
*Elongation at break in excess of 50%.
**Melt Flow Index at 230° C./3.8 kg.

TABLE 2

KEY PROPERTIES OF BLENDS CONTAINING MODIFIED RUBBER COMPOSITIONS

| EXAMPLE | (PC/PMMA/EPDM)# | NOTCHED IZOD (FPPI) @ ROOM TEMP. | | DTL @ 264 psi °C. |
|---|---|---|---|---|
| | | ¼" | ⅛" | |
| 11 | 30/60/10 | 4.9 | 8.4 | 98 |
| 12 | 45/45/10 | 9.6 | 13.4 | 103 |
| 13 | 30/60/10 | 2.2 | 3.8 | 96 |
| 14 | 45/45/10 | 4.1 | 5.9 | 100 |
| 15 | 30/60/10 | 4.5 | 6.3 | — |
| 16 | 30/60/10 | 5.5 | 6.5 | 96 |
| 17 | 30/60/10 | 3.4 | 4.7 | — |
| 18 | 30/60/10 | 4.1 | 5.9 | — |
| 19 | 30/60/10 | 0.9 | 0.9 | — |

Contain Cyro's H-12 PMMA and G.E.'s Lexan ® 141 PC
EXAMPLE 11 & 12: Standard EPDM Modifier. (i.e., 32% EPDM, 10% styrene, 1% MA, 57% MMA)
EXAMPLE 13 & 14: Modified EPDM Modifier. (i.e., 32% EPDM, 10% styrene, 12% acrylonitrile, 1% MA, 45% MMA)
EXAMPLE 15: Modified EPDM Modifier. (i.e., 32% EPDM, 1% MA, 67% MMA)
EXAMPLE 16: Modified EPDM Modifier. (i.e., 32% EPDM, 18% styrene, 1% MA, 49% MMA)
EXAMPLE 17: Modified EPDM Modifier. (i.e., 49% EPDM, 8% styrene, 1% MA, 42% MMA)
EXAMPLE 18: Modified EPDM Modifier. (i.e., 22% EPDM, 6% styrene, 2% MA, 70% MMA)
EXAMPLE 19: Modified EPDM Modifier. (i.e. 50% EPDM, 7% alpha-methyl styrene, 1% MA, 42% MMA)

A large sample of modifier was prepared in the pilot plant for further blend evaluation (Example 2). Various levels of EPDM rubber, PC and PMMA were prepared from it. The results are presented in Table 3. As shown, the previously obtained high notched Izods obtained with laboratory prepared modifier were confirmed with the larger batch modifier based blends. Also, as previously noted,

EFFECT OF MOLECULAR WEIGHT OF PMMA

Table 4 shows the results on some key properties of varying the molecular weight of the PMMA used. A large sample of modifier was prepared according to Example 2 and blended with varying blends of PC and PMMA at a constant EPDM level of 10%. It can be seen that, at PC levels equal to or below 30% of the total, the notched Izod impacts obtained are significantly higher when using the higher molecular weight PMMA. At PC levels of 45% and higher, the lower molecular weight PMMA provides equivalent to better notched Izods at room temperature, but generally lower ones at −20° C. Surprisingly, these results are not translated into dart drop resistance.

Thus, irrespective of compositions and type of PMMA used, over a broad range of compositions, i.e. 15% PC to 60% PC, the dart drop resistance of these blends is essentially identical.

High practical impacts (i.e., dart drop) are obtained at all levels of PC tested, irrespective of the type of PMMA and level of PC. The decrease in dart drop resistance at lower PC levels is quite small, less than 20%. This is in contrast to the notched Izod behavior which is very dependent on PC level especially at the lower levels.

Tensile strength and tensile modulus are relatively unaffected over the range of PC and PMMA levels and PMMA levels and PMMA molecular weight. Elongation at break (a measure of toughness) is generally higher when higher molecular weight PMMA is used and highest when PC is the predominant phase (i.e., 60%).

TABLE 4

KEY PROPERTIES OF PC/PMMA/EPDM BLENDS#

| SAMPLE | MATERIAL COMPOSITION PC/PMMA/EPDM | NOTCHED IZOD (fppi) @ ROOM TEMP. 1/4" | 1/8" | @ −20° C. 1/4" | 1/8" | DART* DROP (fppi) | TENSILE STRENGTH (psi) | ELONGATION YIELD/BREAK (%) | TENSILE MODULUS × 10⁶ (psi) |
|---|---|---|---|---|---|---|---|---|---|
| 31** | 15/75/10 | 1.6 | — | 0.6 | — | 43 | 8500 | 4.6/33 | .33 |
| 32 | 30/60/10 | 6.3 | 5.9 | 1.2 | 3.4 | 48 | 8600 | 4.9/26 | .33 |
| 33 | 45/45/10 | 8.6 | 11.1 | 4.4 | 10.2 | 44 | 8400 | 5.1/24 | .31 |
| 34 | 60/30/10 | 11.4 | 25.6 | 12.8 | 28.6 | 50 | 8400 | 5.3/83 | .30 |
| 35*** | 15/75/10 | .8 | .6 | 0.5 | 0.2 | 48 | 8100 | 4.2/18 | .36 |
| 36 | 30/60/10 | .8 | 1.7 | 0.5 | 0.5 | 45 | 8000 | 4.2/24 | .35 |
| 37 | 45/45/10 | 18.6 | 28.1 | 2.3 | 4.2 | 35 | 8300 | 5.4/36 | .31 |
| 38 | 60/30/10 | 16.7 | 23.0 | 3.4 | 26.1 | 53 | 8400 | 5.2/51 | .29 |

Using Cyro's H-12 & L-40 PMMA. G.E.'s Lexan ® 141 PC.
*On 1/8" thick molded plaques
**Samples 31-34 with Cyro's H-12 PMMA (higher molecular weight). MFI 7.0.
***Samples 35-38 with Cyro's L-40 PMMA (lower molecular weight). MFI 29.0.

IMPACT PROPERTIES

A commercial modifier (Uniroyal's Royalite® 372—which is an EPDM modified with styrene and acrylonitrile) was used with PMMA and PC in Examples 39-41, Table 5. This modifier was used to prepare blends equivalent to our blends in terms of PC levels and additional PMMA was added to the SAN present so as to bring the combined SAN/PMMA level to that of PMMA present in blends according to our invention. As can be seen from the properties at equivalent levels of PC, PMMA and EPDM, materials based on our modifier (Examples 32-34) exhibit significantly better impact properties and a lighter color which is preferable.

Example 44 shows good notched Izod impact and elongation at break in a blend of a copolyester (Eastman Chemical® PCTG 5411), PMMA and an EPDM modifier.

Example 45 shows a good level of notched Izod impact and heat resistance in a blend of styrene maleic anhydride (Arco Dylark® 332), PMMA and our EPDM modifier.

Example 46 shows good notched Izod and overall properties in a blend of PVC (Goodrich Geon® 102) PMMA and our EPDM modifier.

Examples 47 and 48 show good notched Izod and overall properties in blends with modified polypropylene (Bapolene® 5042-EPDM modified polypropylene) either alone or in combination with PC, PMMA and our

TABLE 5

COMPARISON OF EPDM MODIFIED RUBBER COMPOSITIONS PRESENT INVENTION VS COMMERCIAL EPDM MODIFIER

| EXAMPLE | MATERIAL DESCRIPTION (PC/PMMA/EPDM) | NOTCHED IZOD (fppi) @ RM TEMP 1/4" | 1/8" | −20° C. 1/4" | 1/8" | TENSILE STRENGTH (psi) | ELONGATION YIELD/BREAK (%) | TENSILE MODULUS × 10⁶ (psi) | YELLOW INDEX |
|---|---|---|---|---|---|---|---|---|---|
| 32 | 30/60/10 | 6.3 | 5.9 | 1.2 | 3.4 | 8600 | 5/26 | 0.33 | 3 |
| 33 | 45/45/10 | 8.6 | 11.1 | 4.4 | 10.2 | 8400 | 5/24 | 0.31 | 3 |
| 34 | 60/30/10 | 11.4 | 25.6 | 12.8 | 28.6 | 8400 | 5/83 | 0.30 | 3 |
| 39 | 30/60/10* | 1.9 | 3.1 | 0.9 | 1.5 | 8400 | 5/24 | — | 8 |
| 40 | 45/45/10* | 6 | 8.4 | 1.5 | 3.0 | 7900 | 5/53 | 0.33 | 8 |
| 41 | 60/30/10* | 10.3 | 12.6 | 3.2 | 7.8 | 8900 | 5/43 | — | 11 |

*Uniroyal Royalite 372 modifier (i.e. EPDM-SAN modifier) blended into Cyro's H-12 PMMA and G.E.'s Lexan ® 141 PC

OTHER BLENDS

Other blends than those containing PMMA, PC and the modifier are possible. A variety of these were obtained using the same procedure as previously described. Table 6 gives a listing of such blends.

As can be seen, interesting results were obtained in a number of them.

EPDM modifier.

EXAMPLE 49 shows high notched Izod impact and improved heat resistance in a blend consisting of PC, chlorinated polyethylene (Dow Tyril® 3615), PMMA and our modifier.

EXAMPLES 52 through 54 show good toughness (i.e. notched Izod, elongation at break) in blends of super tough nylon (DuPont Nylon® 801 ST), PMMA and our modifier.

TABLE 6

KEY PROPERTIES OF VARIOUS BLENDS

| EXAMPLE | COMPOSITION (WT %) | NOTCHED IZOD @ ROOM TEMP. 1/4" (fppi) | 1/8" | TENSILE STRENGTH (psi) | ELONGATION YIELD/BREAK (%) | DTL/ VICAT °C. | NOTCHED IZOD @ −20° C. 1/4" (fppi) |
|---|---|---|---|---|---|---|---|
| 3 | PC (100)# | 2.5 | — | 8900 | 6.6/50+ | 125-132/154 | — |
| 23 | PC/PMMA/EPDM (45/45/10) | 14.1 | 18.2 | 7100 | 5.1/50+ | —/134 | — |
| 22 | PC/PMMA/EPDM (30/60/10) | 5.4 | 8.9 | 7200 | 4.8/50+ | —/115 | — |
| 44 | PCTG/PMMA/EPDM*** | 1.3 | 4.5 | 6400 | 5/50+ | 78/108 | — |

TABLE 6-continued

| EXAMPLE | COMPOSITION (WT %) | NOTCHED IZOD @ ROOM TEMP. ⅛" (fppi) | | TENSILE STRENGTH (psi) | ELONGATION YIELD/BREAK (%) | DTL/ VICAT °C. | NOTCHED IZOD @ -20° C. ⅛" (fppi) |
|---|---|---|---|---|---|---|---|
| | (45/44/45/10) | | | | | | |
| 45 | SMA/PMMA/EPDM**** (30/60/10) | 0.9 | 1.1 | 7800 | 4/8 | 101/119 | — |
| 46 | PVC/PMMA/EPDM***** (30/60/10) | 2.2 | 2.2 | 6200 | 3/35 | 74/96 | — |
| 47 | PC/PP/PMMA/EPDM****** (25/20/45/10) | 1.7 | 2.2 | 5300 | 5/37 | 93/119 | — |
| 48 | PP/PMMA/EPDM****** (30/60/10) | 1.5 | 1.3 | 4300 | 4/16 | 82/109 | — |
| 49 | PC/CPE/PMMA/EPDM******* (30/15/45/10) | 3.0 | 10.8 | 4700 | 5/48 | —/124 | — |
| 50 | PP/PMMA/EPDM* (30/60/10) | 0.7 | 0.3 | 3900 | —/3 | 85/112 | — |
| 51 | PET/PMMA/EPDM** (30/60/10) | 0.4 | 0.5 | 7200 | 4/9 | 84/109 | — |
| 52 | NYLON/PMMA/EPDM (30/60/10) | 0.5 | — | 6130 | 4/33 | —/113 | 0.3 |
| 53 | NYLON/PMMA/EPDM (45/45/10) | 3.5 | — | 5950 | 5/49 | —/167 | 2.7 |
| 54 | NYLON/PMMA/EPDM (60/30/10) | 4.5 | — | 5640 | 5/77 | —/— | 2.7 |

PC: Polycarbonate GE Lexan ® 141
*PP: Shell 5550 Polypropylene
**PET: Eastman Chemicals Pet Bottle Resin 7362
***PCTG: Kodak ® PCTG 5445 (copolyester).
****SMA: Arco Dylark ® 332.
*****PVC: Goodrich Geon ® 102 EP stabilized.
******PP: Bapolene ® 5042 EPDM modified polypropylene.
*******CPE: Chlorinated polyethylene Tyrin ® 3615.
NYLON: Dupont's Nylon 801 Super Tough

CHEMICAL RESISTANCE

The chemical resistance of our blends compared to some other plastic materials against three common automotive fluids, i.e., gasoline, motor oil and ethylene glycol is shown in Table 7.

The results indicate that our PC/PMMA/EPDM blends are superior to Noryl ® and Rovel ® as far as gasoline resistance. As far as ethylene glycol and motor oil, all the materials tested exhibited small changes.

TABLE 7

Chemical Resistance of Various Plastics (ASTM 543(I) Test)*

| Example | Chemical Plastic | Gasoline % Change | | Ethylene Glycol % Change | | Motor Oil % Change | |
|---|---|---|---|---|---|---|---|
| | | Vol | Wt | Vol | Wt | Vol | Wt |
| 91 | PMMA H-15 (CYRO) | 0.5 | 0 | 0.5 | 0.1 | —0.1 | 0 |
| | PC/PMMA/EPDM | | | | | | |
| 32 | 30/60/10 | 2.3 | 1.2 | 0.1 | 0 | 0.8 | 0 |
| 33 | 45/45/10 | 0 | 0.2 | —0.8 | —0.1 | 0 | 0 |
| 34 | 60/30/10 | 2.0 | 1.7 | 1.0 | 0 | 0.1 | 0 |
| 61 | EPDM/SAN (Rovel ® 501-Dow) | 10.4 | 9.0 | 1.1 | 0.1 | 0.3 | 0 |
| 63 | EPDM/SAN (Rovel ® 701-Dow) | 9.2 | 7.9 | —0.3 | 0 | 1.0 | 0 |
| 64 | Rovel ® 747 (PC/Rovel) 50/50 | 0.8 | 0 | 0 | 5.2 | —4.2 | —0.1 |
| 92 | PC/ABS (Bayblend MC 2500-Dow) | —0.5 | 0 | 1.0 | 0.1 | 1.0 | 0 |
| 93 | PPO/HIPS (Noryl ® 731-GE) | 16.1 | 12.7 | 0.9 | 0 | 0.1 | 0 |
| 3 | PC (Lexan ® 141-GE) | 0.4 | 0 | 0.4 | 0.1 | 0 | 0 |

*Absorption and 24 hours dimensional charges

WEATHERABILITY

Equivalent one year weathering (EMMAQUA of stabilized and unstabilized PC/PMMA/EPDM blends and Rovel ® is shown in Table 8. After one year, both stabilized and unstabilized blends according to the invention show impact (dart drop) retention ranging from 33% to 93%. The major influence is the level of PC with higher levels of PC imparting higher impact strength retention. Rovel ® under the same conditions shows 32% impact strength retention, equivalent to the lowest level obtained in the blends according to our invention.

Gloss and yellow index changes are very dependent on the presence of the stabilizer and level of PC present. The higher PC levels result in higher changes. Optimum results are obtained in the stabilized blends according to our invention with lower levels of PC. Compared to Rovel®, it can be seen that the blends show superior final gloss as well as a smaller change in Yellow Index.

Figure 6:
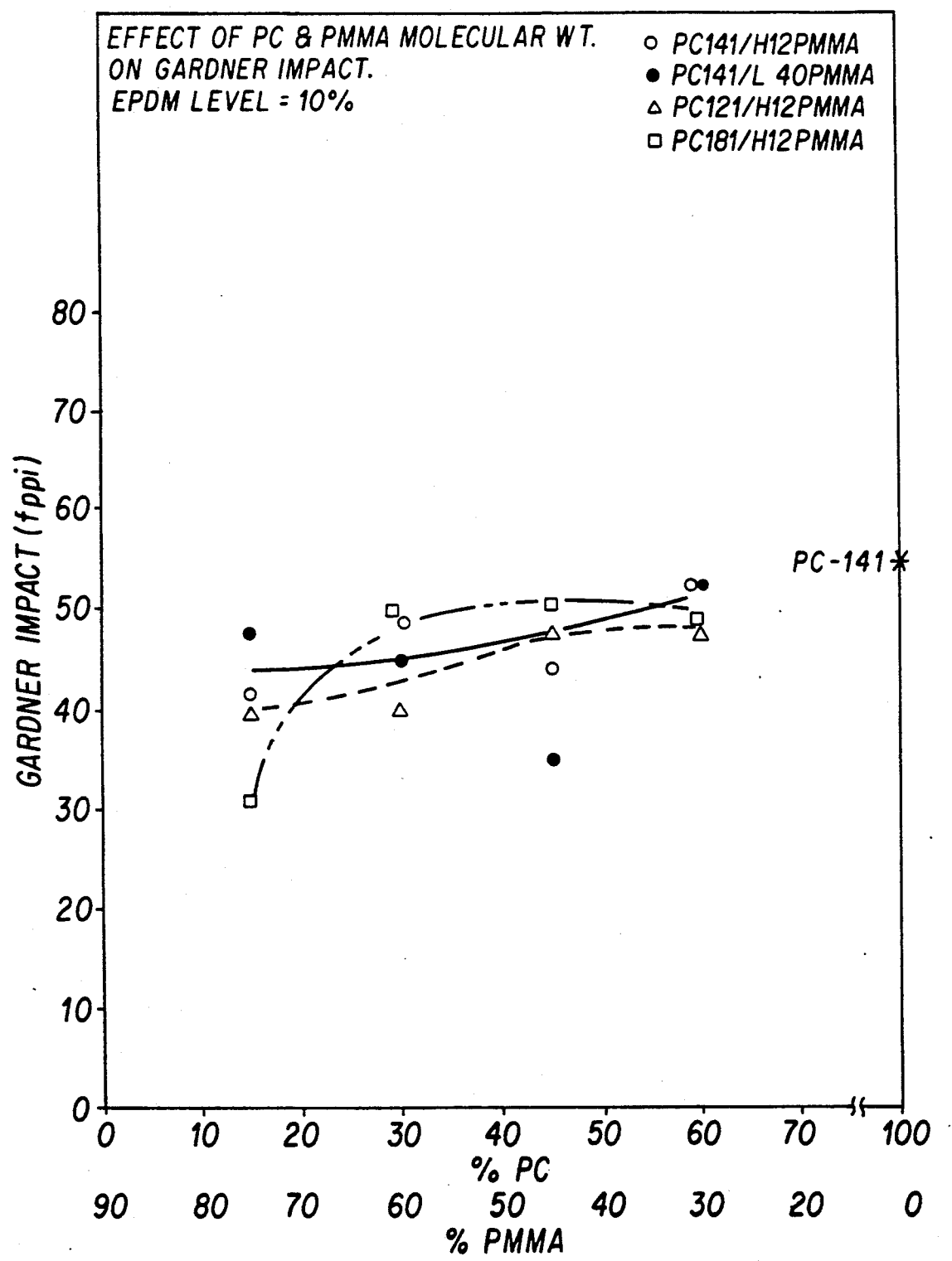
FIG. 6 is a graph of Gardner impact versus relative percentages of PC and PMMA in blends utilizing PC and PMMA of differing molecular weights.

Gardner impact is little affected by PC molecular weight and level over the 15 to 60% PC range (see FIG. 6).

TABLE 8

Property Retention on Accelerated Weathering
(One Year Equivalent - EMMAQUA)

| Example No. | Material | Y.I. Initial | Y.I. After 1 Yr. | Y.I. | Gloss Initial | Gloss After 1 Yr. | Gloss | Dart Drop Initial | Dart Drop After 1 Yr. | % Retention |
|---|---|---|---|---|---|---|---|---|---|---|
| | (PC/PMMA/EPDM) | | | | | | | | | |
| 55 | 60/30/10* | 2.5 | 24 | +21.5 | 97 | 72 | −20 | 47 | 39 | 83 |
| 56 | 45/45/10* | 3 | 15 | +12 | 86 | 87 | +1 | 47 | 22 | 47 |
| 57 | 30/60/10* | 4 | 13 | +9 | 89 | 88 | −1 | 46 | 15 | 33 |
| 58** | 60/30/10** | 3 | 38 | +35 | 90 | 45 | −45 | 45 | 42 | 93 |
| 59** | 45/45/10** | 3 | 36 | +33 | 94 | 75 | −19 | 48 | 22 | 46 |
| 60** | 30/60/10** | 3 | 22 | +19 | 92 | 85 | −7 | 45 | 17 | 38 |
| 61 | Rovel ® 501 | −9 | 17 | +26 | 75 | 55 | −20 | 37 | 12 | 32 |

*Stabilized with 0.12% UV 5411, 0.16% Cyasorb ® 3346, 0.12% Irganox ® 1076, 0.06% Weston ® 619
**Unstabilized

EFFECT OF PC MOLECULAR WEIGHT OF PC

The EPDM composition from Example 2 was used to prepare PC blends according to the invention with different molecular weight polycarbonates, i.e., Lexan® 181—high molecular weight; Lexan® 121—molecular weight Table 4 shows the results using an intermediate molecular weight, Lexan® 141. All materials contained 10% rubber. The results are presented in Tables 4 and 9 and plotted in FIGS. 1-10.

Use of the higher molecular weight PC results in significantly improved notched Izods over those obtained with the lower molecular weight PC's, particularly in the 30% to 45% PC range. The improvement holds for both ⅛" and ¼" thick notched Izods, at room temperature and −20° C. (see FIGS. 1-4). This allows lowering the PC level—a very significant cost reduction step—without affecting impact.

Figure 2:
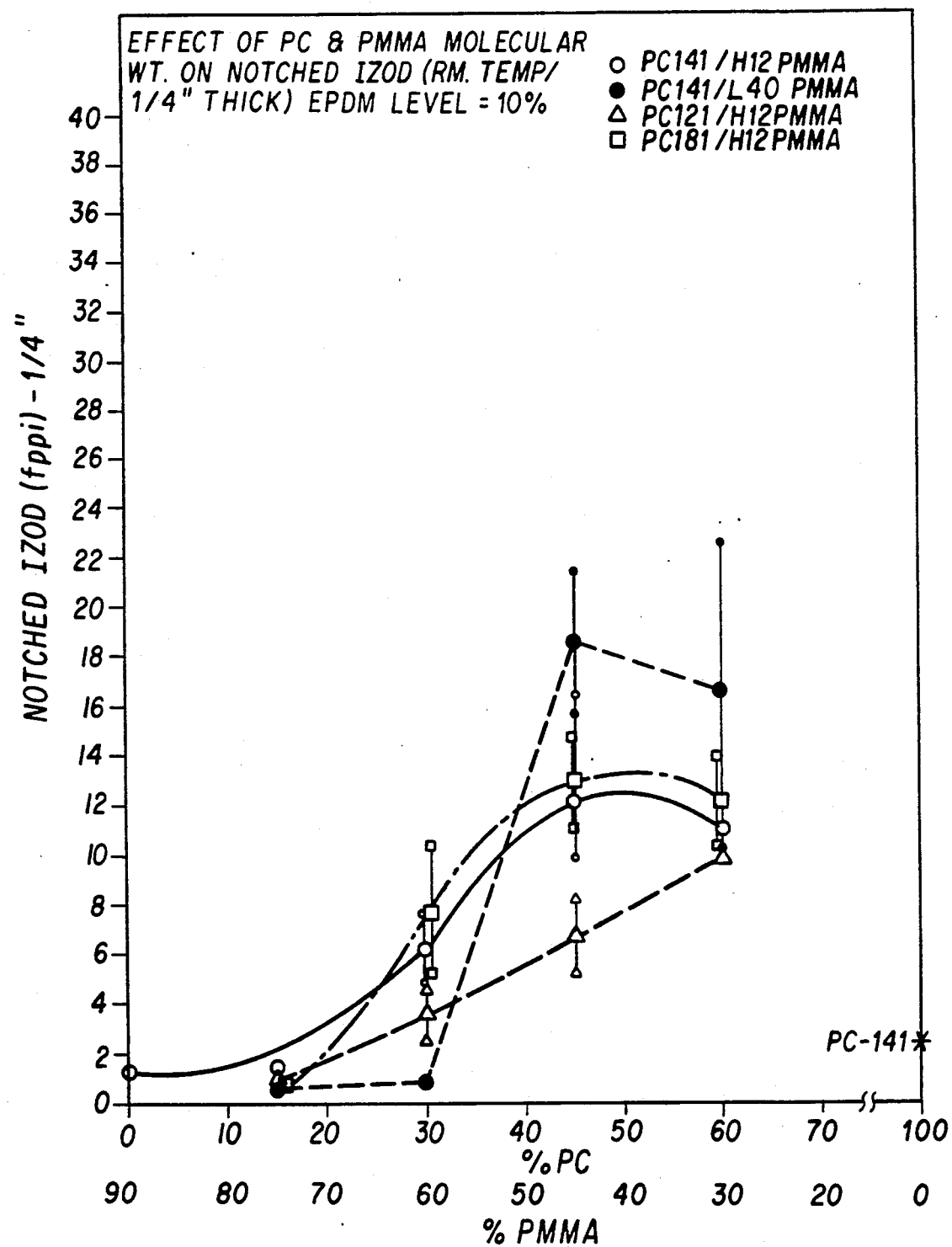
FIG. 2 is a graph of notched Izod impact (at room temperature, ¼" thick piece) versus relative percentages of polycarbonate and PMMA in blends according to the invention utilizing polycarbonate and PMMA of differing molecular weights.

The higher molecular weight PC also leads to an apparent maximum notched Izod at 45% PC, at room temperature, for both ⅛" and ¼" Izods (see FIGS. 1 and 2). This effect is much less clear with lower molecular weight PC's.

Figure 3:
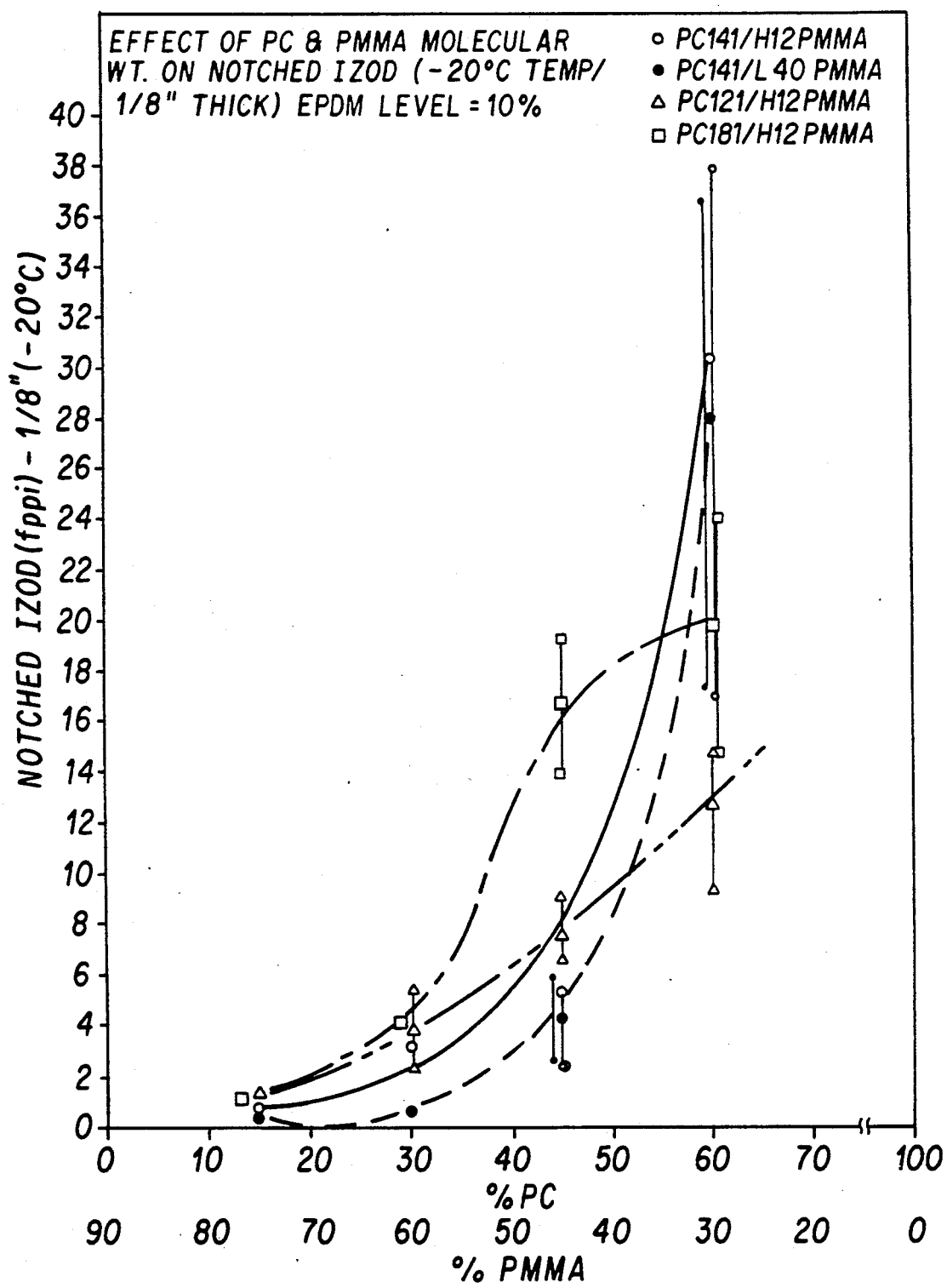
FIG. 3 is a graph of notched Izod impact (at −20° C., ⅛" thick piece) versus relative percentages of polycarbonate and PMMA in blends according to the invention utilizing polycarbonate and PMMA of differing molecular weights.
Figure 4:
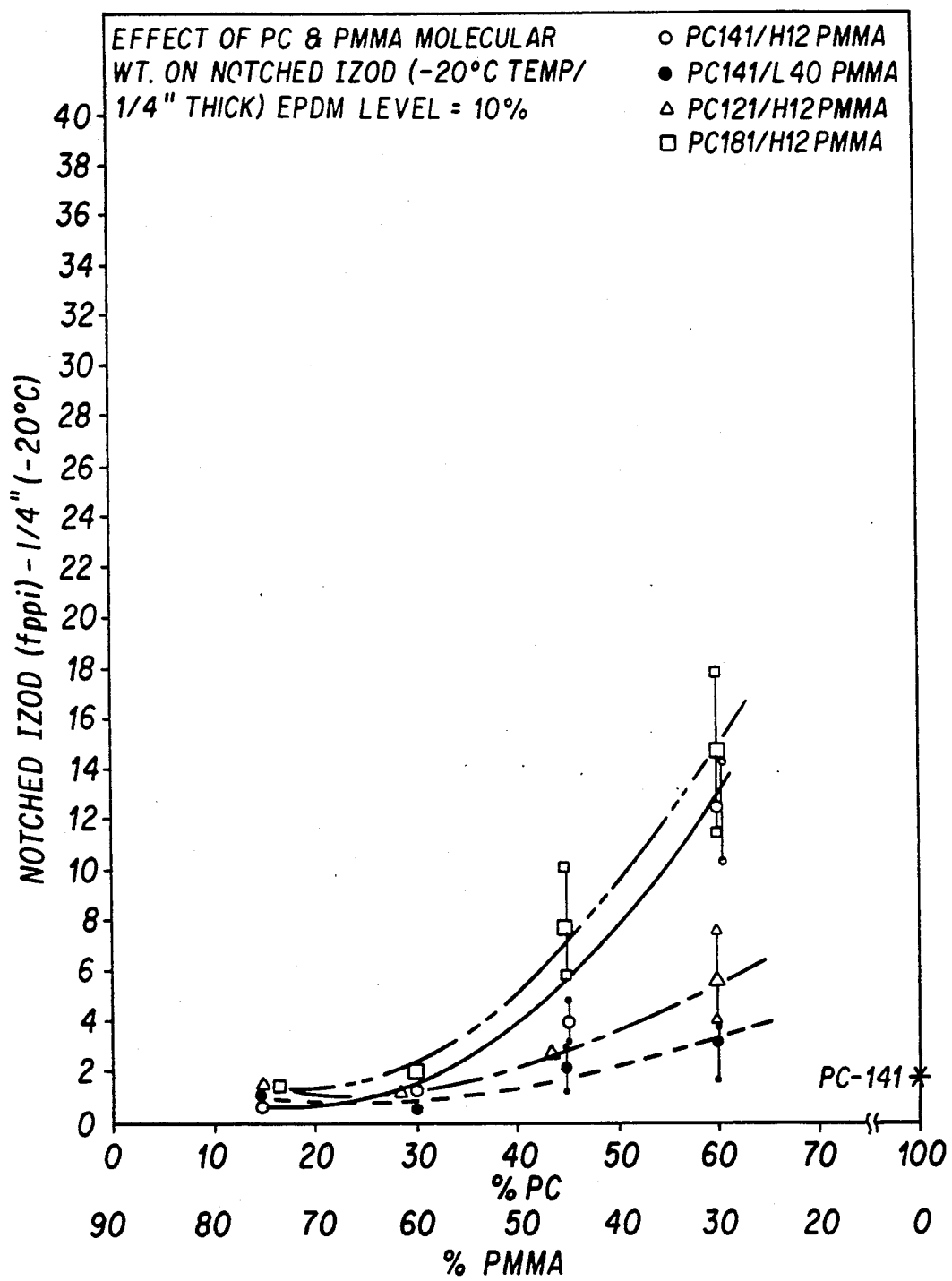
FIG. 4 is a graph of notched Izod impact (at −20° C., ¼" thick piece) versus relative percentages of polycarbonate and PMMA in blends according to the invention utilizing polycarbonate and PMMA of differing molecular weights.
Figure 5:
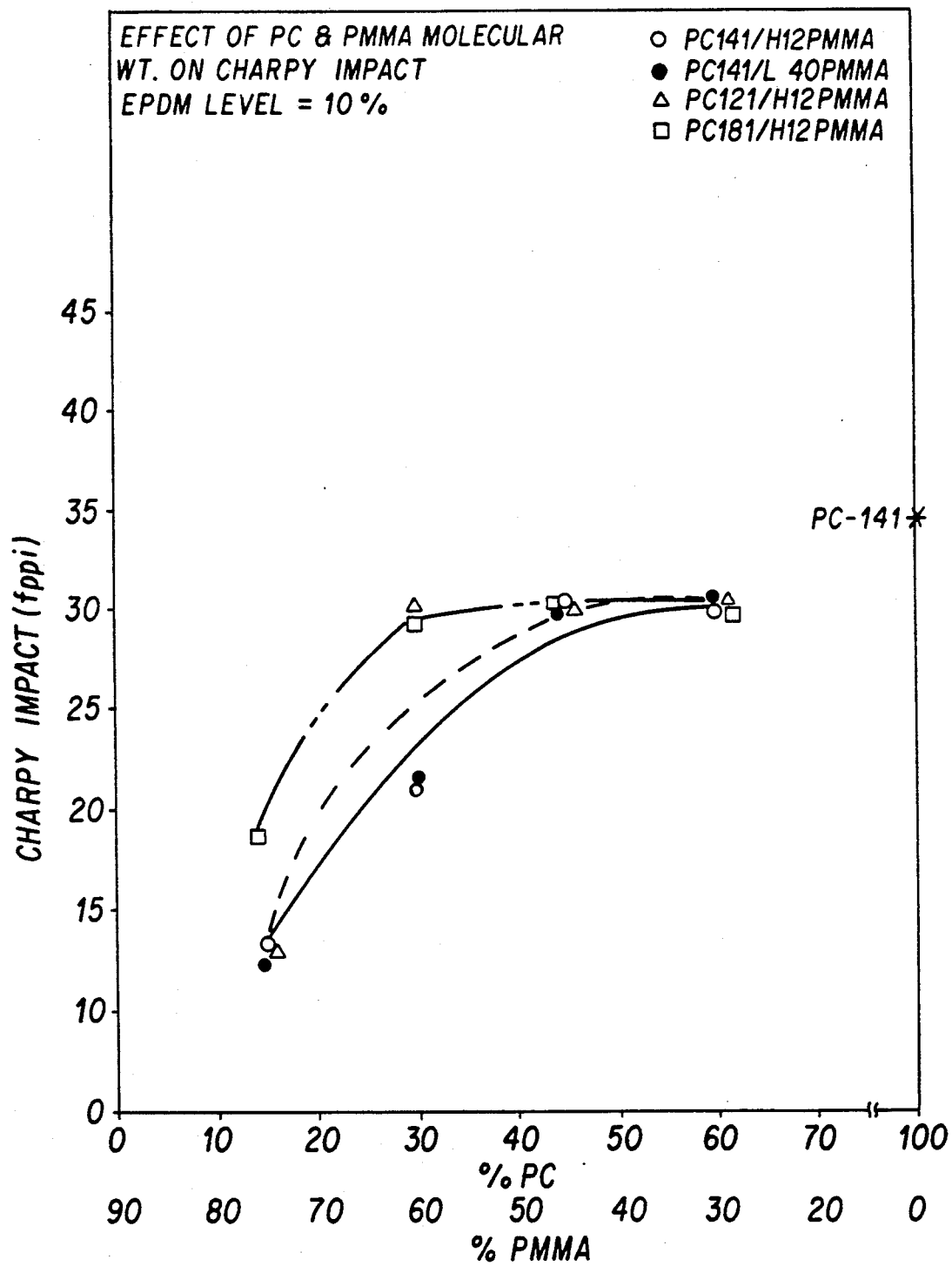
FIG. 5 is a graph of Charpy impact versus relative percentages of PC and PMMA in blends utilizing PC and PMMA of differing molecular weights.

Notched Izods at −20° C. increase with increasing PC levels (see FIGS. 3 and 4).

Highest Charpy values are obtained irrespective of PC molecular weight at PC levels of 45% and above. Use of the higher molecular weight PC allows a lower level of PC (down to 30%) without adverse effect on the Charpy (see FIG. 5).

Figure 7:
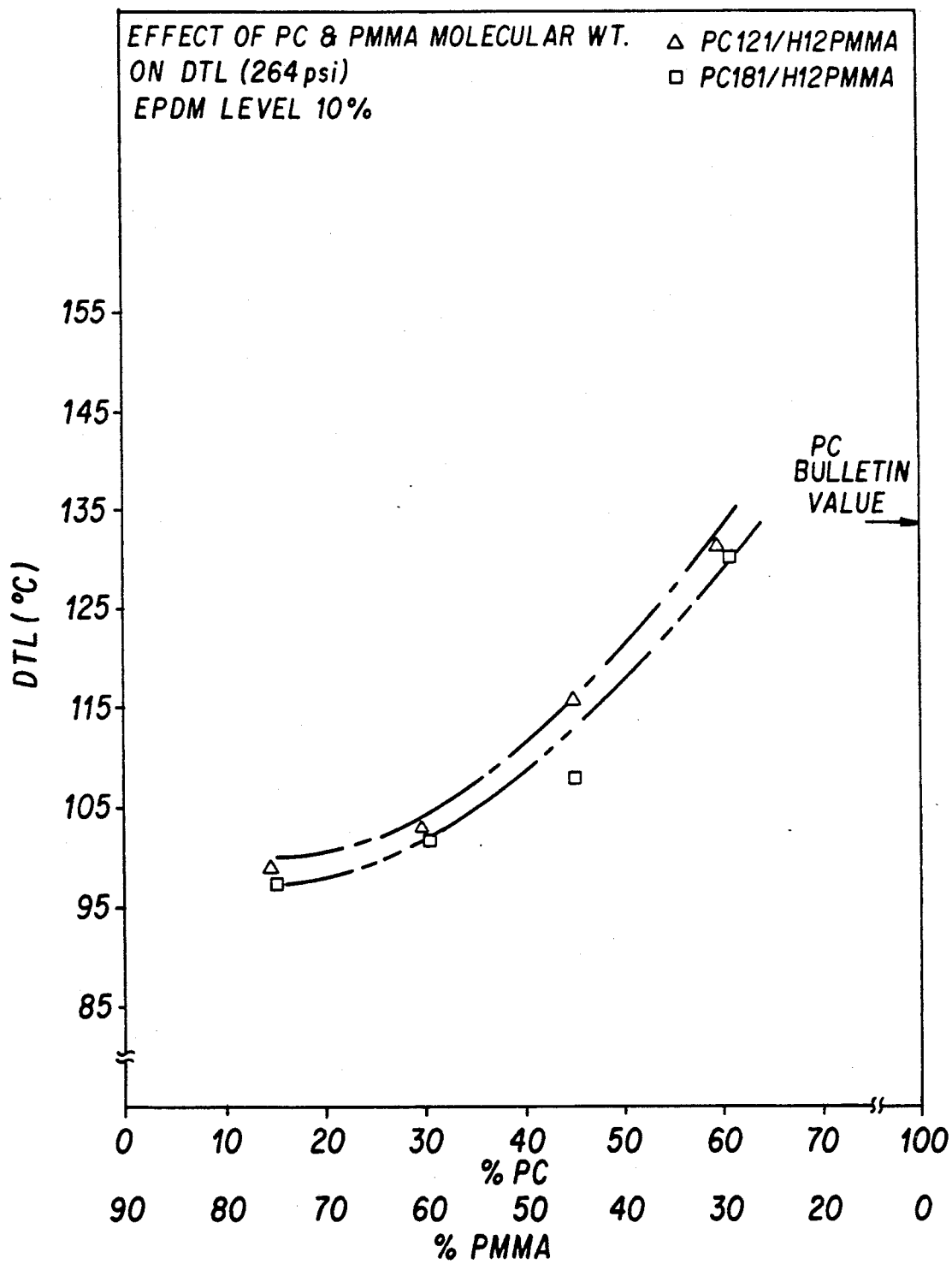
FIG. 7 is a graph of DTL versus relative percentages of PC and PMMA in blends utilizing PC and PMMA of differing molecular weights.
Figure 8:
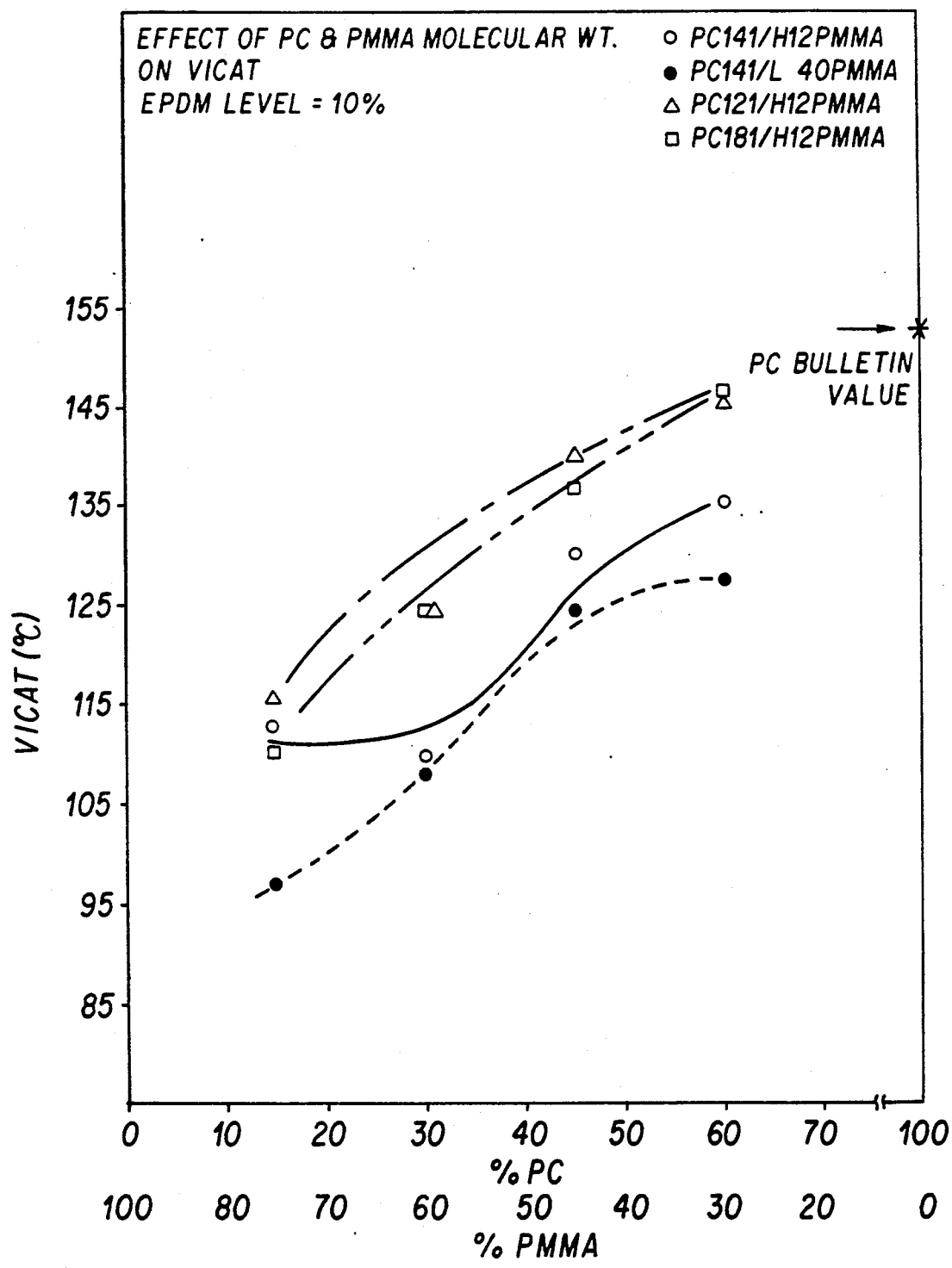
FIG. 8 is a graph of Vicat versus relative percentages of PC and PMMA in blends utilizing PC and PMMA of differing molecular weights.
Figure 9:
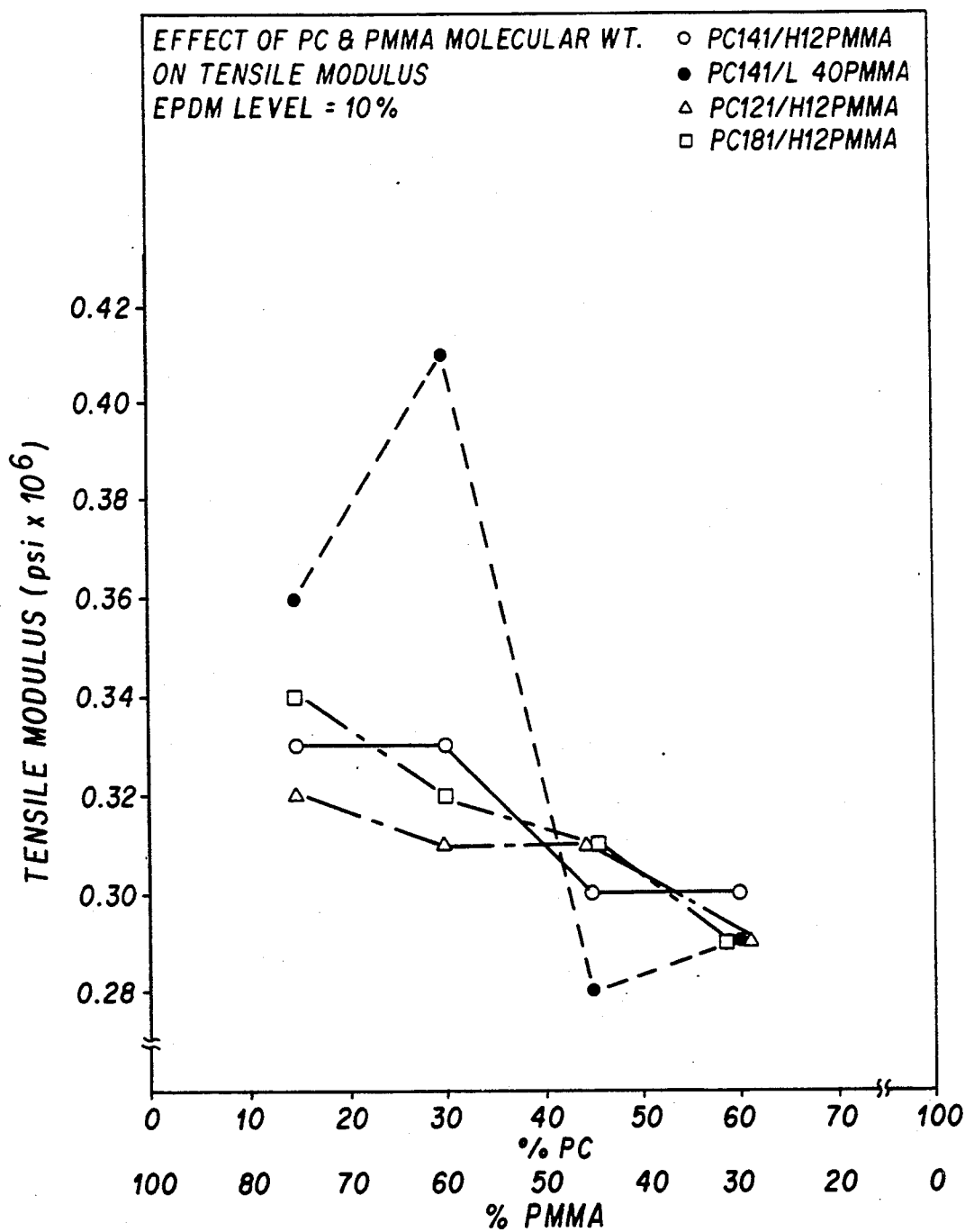
FIG. 9 is a graph of tensile modulus versus relative percentages of PC and PMMA in blends utilizing PC and PMMA of differing molecular weights.
Figure 10:
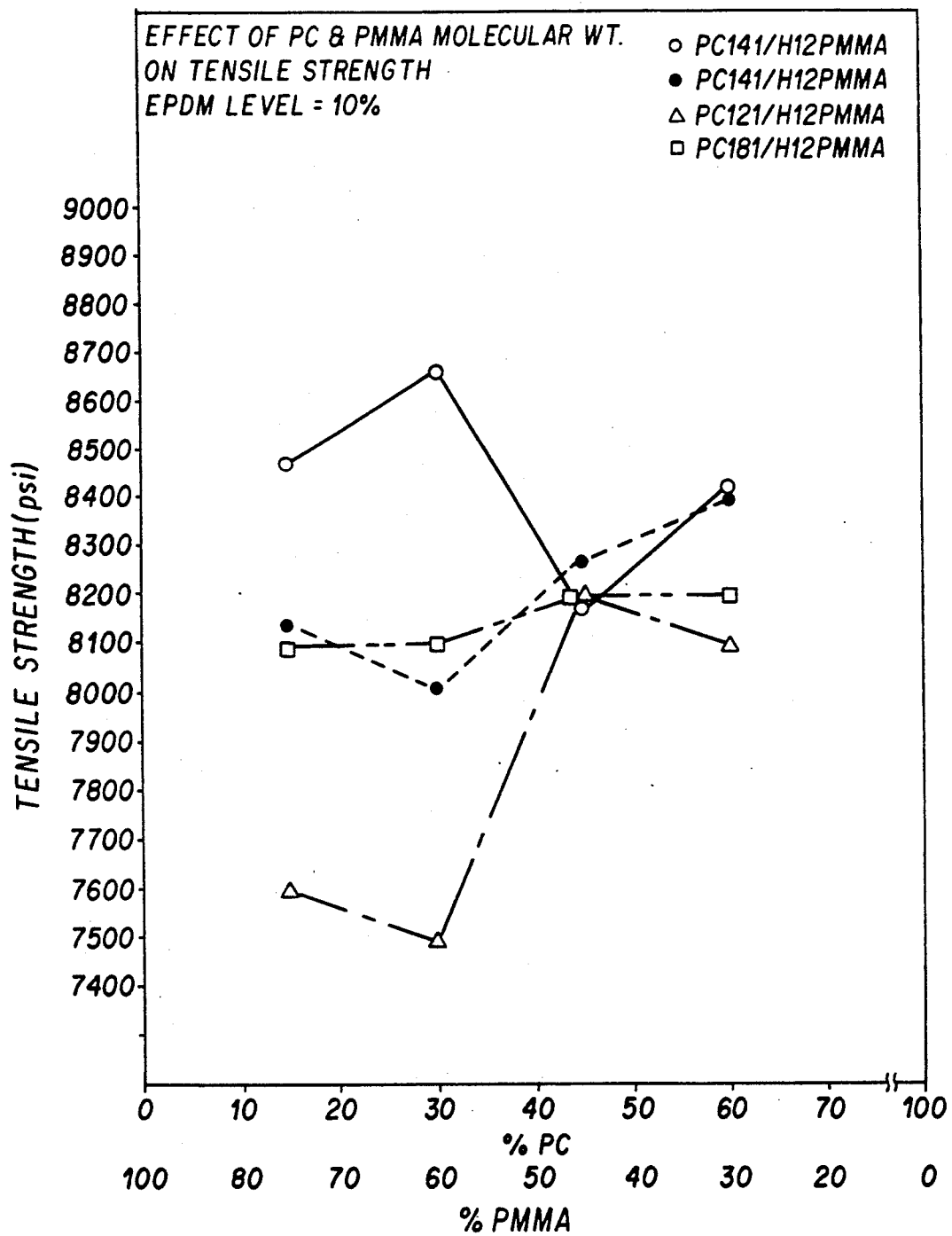
FIG. 10 is a graph of tensile strength versus relative percentages of PC and PMMA in blends utilizing PC and PMMA of differing molecular weights.

Both the higher and lower molecular weight PC's result in essentially similar DTL's and Vicats (see FIGS. 7 and 8).

Tensile strength and modulus are relatively unaffected by PC molecular weight and level. Use of the higher molecular weight PC appears however to give a more homogeneous blend as shown by the smaller variability in tensile strength compared to blends with lower molecular weight PC's (see FIGS. 9 and 10).

The better "homogeneity" achieved with high molecular weight PC is also reflected in reduced variability in the notched Izods (i.e., lower coefficients of variation).

TABLE 9

KEY PROPERTIES OF PC/PMMA/EPDM BLENDS (Example 2)

| Example No. | MATERIAL COMPOSITION PC/PMMA/EPDM | NOTCHED IZOD (fppi) @ Rm Temp ⅛" | NOTCHED IZOD (fppi) @ Rm Temp ¼" | NOTCHED IZOD (fppi) @ −20° C. ⅛" | NOTCHED IZOD (fppi) @ −20° C. ¼" | CHARPY IMPACT (fppi) | DART (a) DROP (fppi) | TENSILE STRENGTH (psi) | ELONGATION YIELD/ BREAK (%) | TENSILE MODULUS × 10⁶ (psi) | DTL °C. | Vicat °C. |
|---|---|---|---|---|---|---|---|---|---|---|---|---|
| 81 | 15/75/10* | 1.4 | 1.8 | 0.8 | 0.9 | 13.5 | 41 | 7600 | 4.5/28.4 | 0.32 | 99 | 116 |
| 82 | 30/60/10* | 3.6 | 6.3 | 1.1 | 3.9 | 30.3 | 41 | 7500 | 4.8/50.5 | 0.31 | 103 | 125 |
| 83 | 45/45/10* | 6.8 | 7.8 | 2.6 | 6.6 | 30.1 | 48 | 8200 | 5.0/34.5 | 0.31 | 116 | 141 |
| 84 | 60/30/10* | 9.9 | 11.7 | 5.9 | 10.9 | 30.0 | 48 | 8100 | 5.1/35.4 | 0.29 | 131 | 147 |
| 85 | 15/75/10** | 1.4 | 1.2 | 0.8 | 0.7 | 19.1 | 32 | 8100 | 4.3/46.7 | 0.34 | 98 | 111 |
| 86 | 30/60/10** | 7.8 | 13.3 | 2.0 | 3.7 | 29.8 | 49 | 8100 | 4.7/43.7 | 0.32 | 103 | 125 |
| 87 | 45/45/10** | 13.0 | 24.2 | 7.8 | 14.7 | 30.2 | 51 | 8200 | 5.3/50.5 | 0.31 | 108 | 137 |
| 88 | 60/30/10** | 12.5 | 18.7 | 14.9 | 18.1 | 30.1 | 49 | 8200 | 5.4/67.1 | 0.29 | 131 | 147 |

*Using CYRO's H-12 & G.E.'s Lexan ® 121 PC (lower molecular weight).
**Using CYRO's H-12 & G.E.'s Lexan ® 181 PC (higher molecular weight) - Lexan ® 141 PC is intermediate molecular weight. (See Table 2)
(a) On ⅛" molded plaques.

Dart Drop

A number of materials were characterized as far as practical impact (i.e., dart drop) and are shown in Table 10. Conclusions reached are:

PC, PC/ABS and the blends of the invention are essentially equivalent at room temperature and at the highest level among the materials tested to-date Rovel ® is substantially poorer (70 to 80% of above) though a blend of Rovel ® with Polycarbonate (1:1 Rovel ®-PC) approaches the above.

EPDM/PMMA at 20% rubber, equivalent to Rovel ®) is at approximately 80% of Rovel ®'s value.

Several other materials tested, including high impact ABS and stabilized PVC showed lower impacts.

TABLE 10

DART DROP IMPACT VARIOUS MATERIALS TESTED
(At Room Temperature)

| Example | Material | Dart Drop** (fppi) |
|---|---|---|
| 3 | PC (GE Lexan ® 141) | 55 |
|  | PC/PMMA/EPDM |  |
| 34 | 60/30/10 | 51 |
| 33 | 45/45/10 | 49 |
| 32 | 30/60/10 | 47 |
| 31 | 15/75/10 | 43 |
| 62 | PC/ABS (Mobay ® MC-2500) | 51 |
|  | Rovel ® (EPDM/SAN:20/80) |  |
| 61 | 501 | 36 |
| 63 | 701 | 35 |
| 64 | 747 (1:1 Rovel ®/PC) | 45 |
| 65 | Dow ® ABS (Magnum ® 941) | 23 |

**⅛" molded plaque

Processability

Various materials were evaluated in terms of viscosity vs. shear rate. Our blends, even at high levels of PC, showed superior processability to PC, PPO/HIPS (Noryl ®), and PC/ABS. They could be "tailored" to match Rovel ®'s processability under certain conditions.

Figure 11:
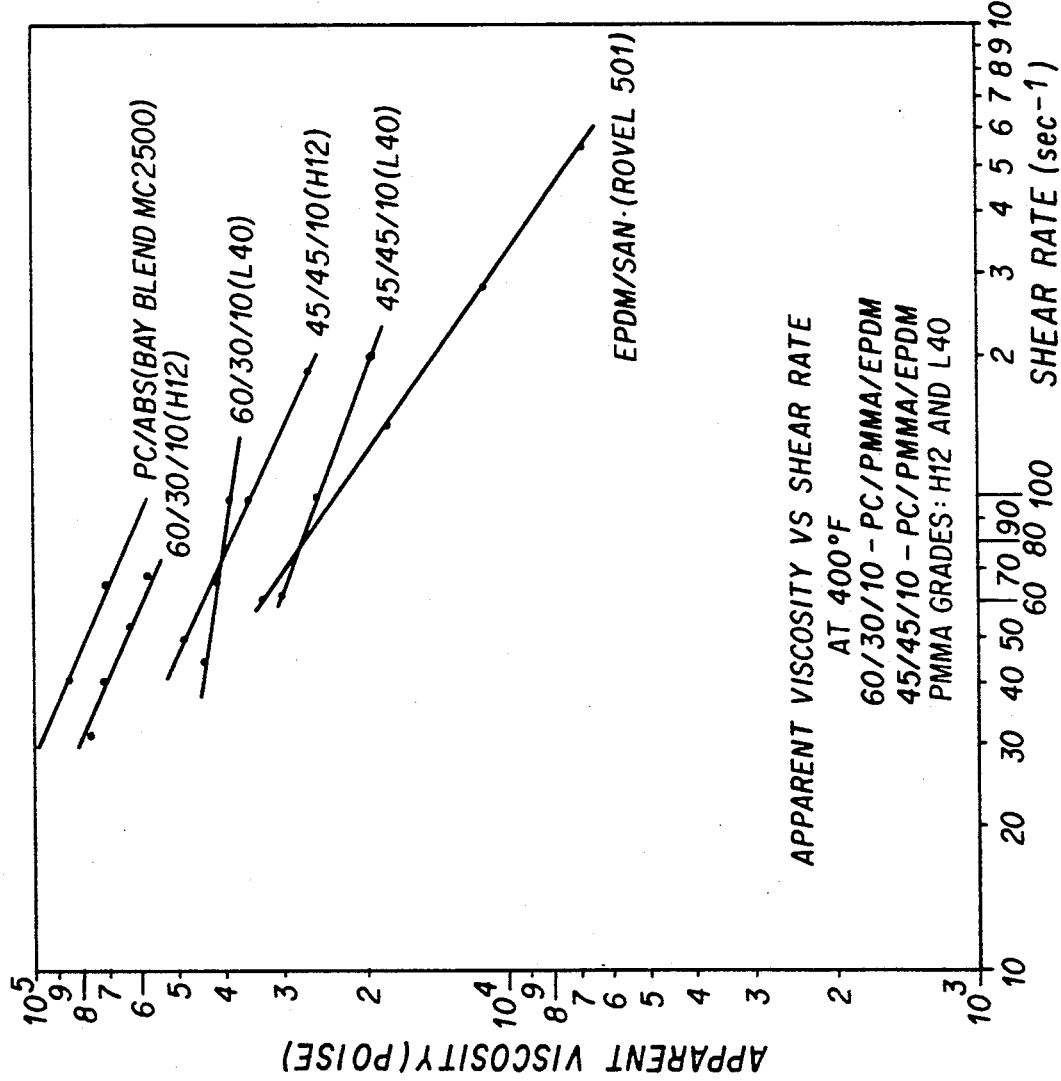
FIG. 11 is a graph of apparent viscosity versus shear rate at 400° F. comparing various blends according to the invention with prior art products.
Figure 12:
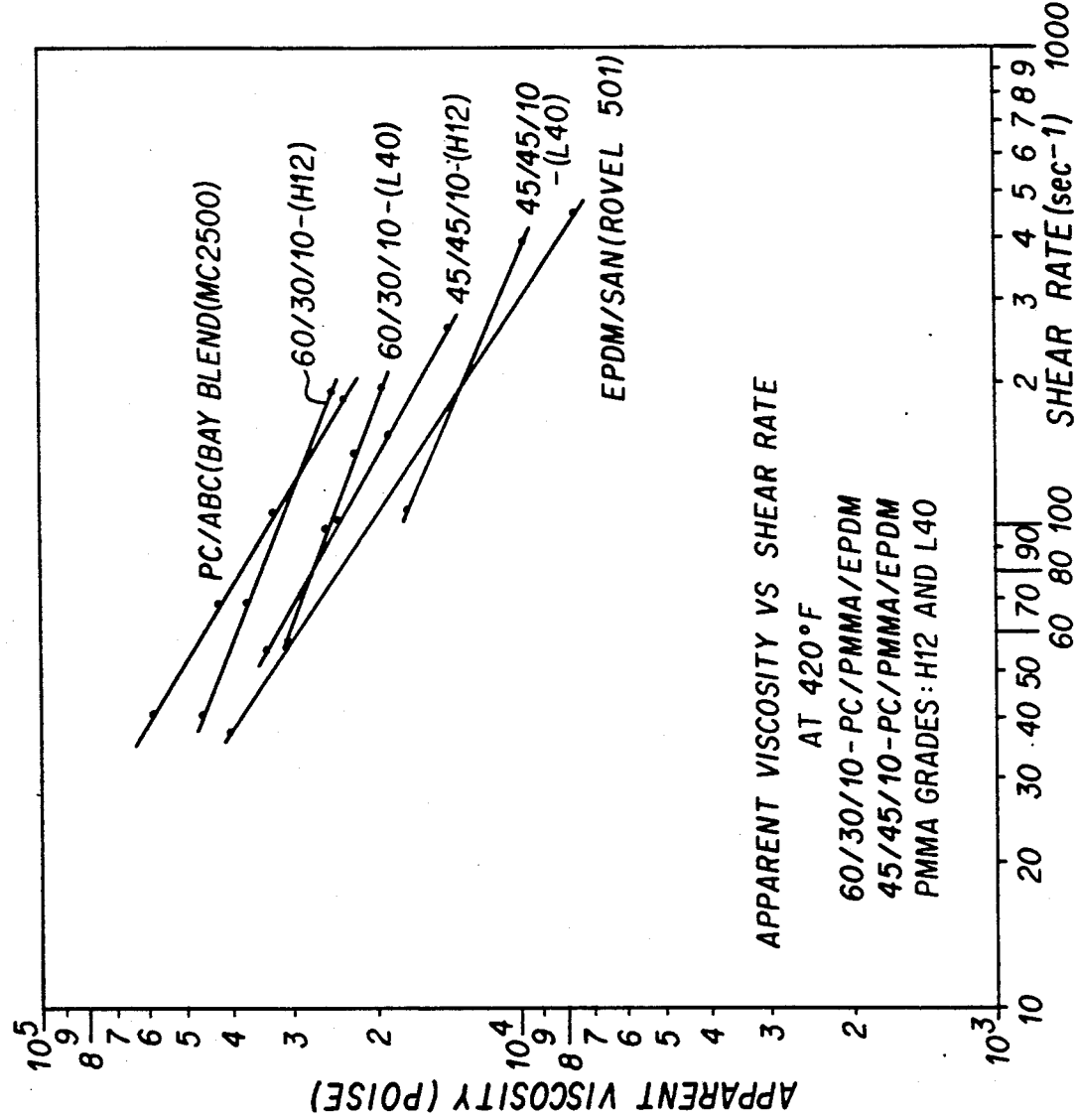
FIG. 12 is a graph of apparent viscosity versus shear rate at 420° F. comparing various blends according to the invention with prior art products.
Figure 13:
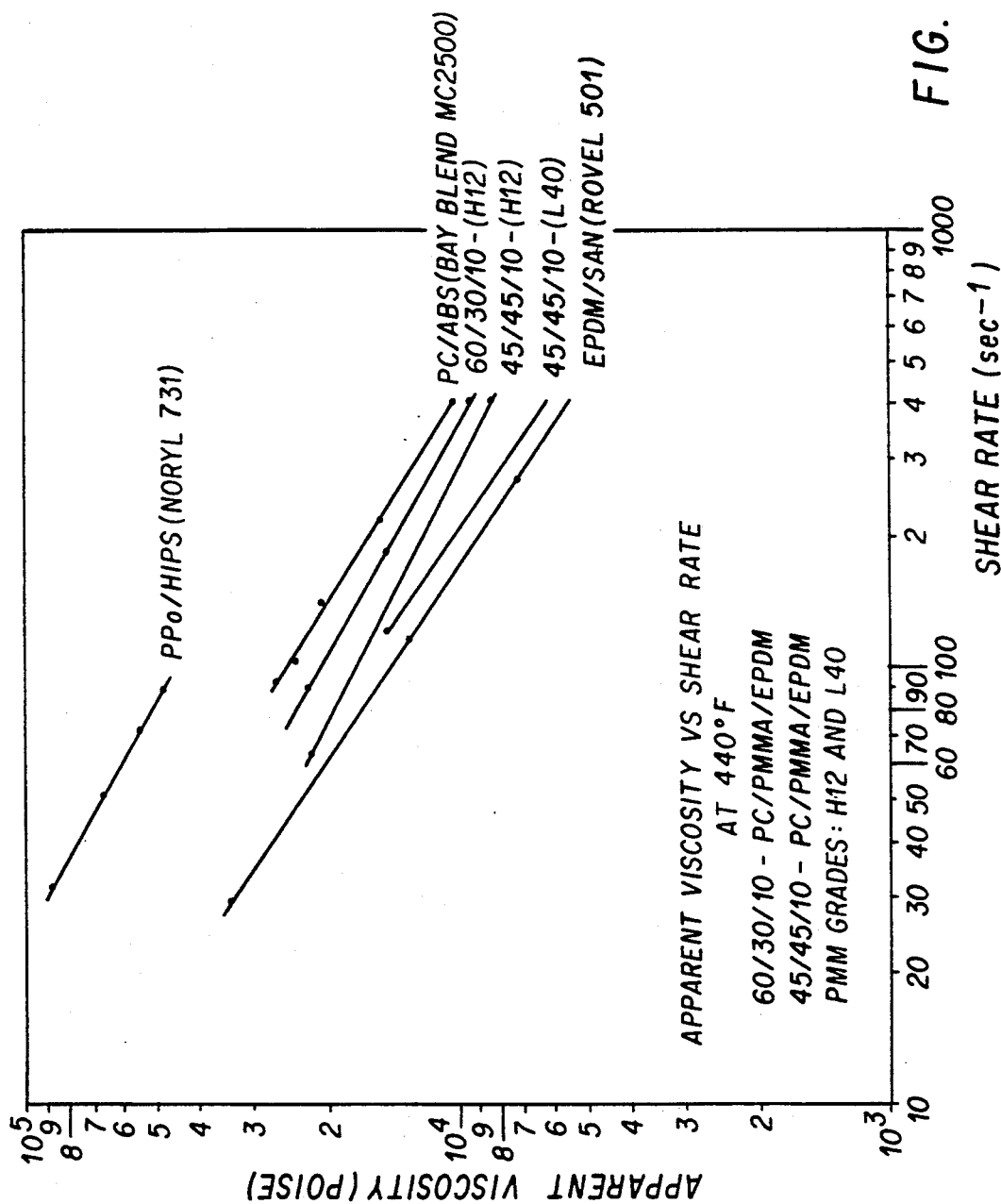
FIG. 13 is a graph of apparent viscosity versus shear rate at 440° F. comparing various blends according to the invention with prior art products.

One measure of processability is flow at different shear rates. Apparent viscosities of various materials at different shear rates were obtained using the Monsanto ® Rheometer and are shown in FIGS. 11 through 13. At the 3 temperatures tested (i.e., 400° F. [204° C.], 420 [216° C.] and 440° F. [227° C.], PC did not flow at all; PPO/HIPS (Noryl ® 731) would only flow at 440° F. (227° C.) and exhibited much higher viscosities than PC/ABS, our blends, or Rovel ®. Compared to PC/ABS, our blends exhibited lower viscosities at all PC ratios tested (from 60 to 30%); and depending on the molecular weight of the PMMA used (i.e. H-12 or L-40) approached the rheological behavior of Rovel ®. These results suggest that our blends are indeed easily processable materials, better then PC/ABS (which is generally considered an easily processable material) and "tailorable" to match Rovel ® under certain conditions.

ADDITIONAL BLENDS

A number of polymers, i.e., Polystyrene, SAN, ABS and PVC were blended with EPDM/PMMA in order to determine their key impact properties. These are shown in Table 11. The findings are summarized below:

Blends of PVC with EPDM/PMMA showed very dramatic notched Izod improvements approximately 11 to 19 fold in the 45 to 60% PVC range. The practical impact was increased approximately 50 to 80% in that range. These results suggested the possibility of PVC/PMMA blends with very high impact and improved DTL and processability over PVC (see below).

Blends of SAN/PMMA/EPDM resulted in relatively high practical impact and notched Izod. There are indications of an optimum ratio of SAN/PMMA which could further improve these properties.

Blends of PS (polystyrene)/PMMA/EPDM showed higher notched Izods at 60/30/10 than PMMA/EPDM at the same rubber level. This is all the more surprising since PS is incompatible with PMMA.

TABLE 11

IMPACT PROPERTIES OF ADDITIONAL BLENDS TESTED
(At Room Temperature)

| Example No. | Material Composition | Notched Izod Impact (⅛" Thick) (fppi) | Dart Drop Impact (⅛" Plaque) |
|---|---|---|---|
|  | San 125/PMMA/EPDM |  |  |
| 66 | 70/20/10 | 0.4 | 16 |
| 67 | 45/45/10 | 1.1 | 26 |
| 68 | 30/60/10 | 1.3 | 19 |
| 69 | Dow ® San 125 (30% AN) - Control | 0.2 | 0* |
| 70 | CYRO PMMA H-12 - Control | 0.3 | 0* |
|  | Styron ® 6850 PS/PMMA/EPDM |  |  |
| 71 | 70/20/10 | 0.3 | 9 |
| 72 | 45/45/10 | 1.7 | 3 |
| 73 | 30/60/10 | 2.2 | 11 |
| 74 | Dow Polystyrene Styron ® 6850 - Control | 0.2 | 0* |
|  | Geon PVC/PMMA/EPDM |  |  |
| 75 | 60/30/10 | 22.3 | 32 |
| 76 | 45/45/10 | 12.7 | 38 |
| 77 | 30/60/10 | 3.2 | 38 |
| 78 | Goodrich PVC Geon ® 85885 - Control | 1.2 | 21 |
|  | ABS/PMMA/EPDM |  |  |
| 79 | 45/45/10 | 3.4 | 29 |
| 80 | 30/60/10 | 2.3 | 25 |
| 65 | Dow ABS Magnum ® 941 - Control | 10.3 | 23 |

*Using 4 lb. Dart - Too brittle to register any height.

PVC/PMMA/EPDM BLENDS

Blends of PVC/PMMA/EPDM were prepared using EPDM from Example 2, Goodrich Geon ® 85885 brown 385 (a weatherable brown, stabilized PVC used for exterior applications) and H-12 PMMA. The results are shown in Table 11 and FIGS. 14–17.

Figure 14:
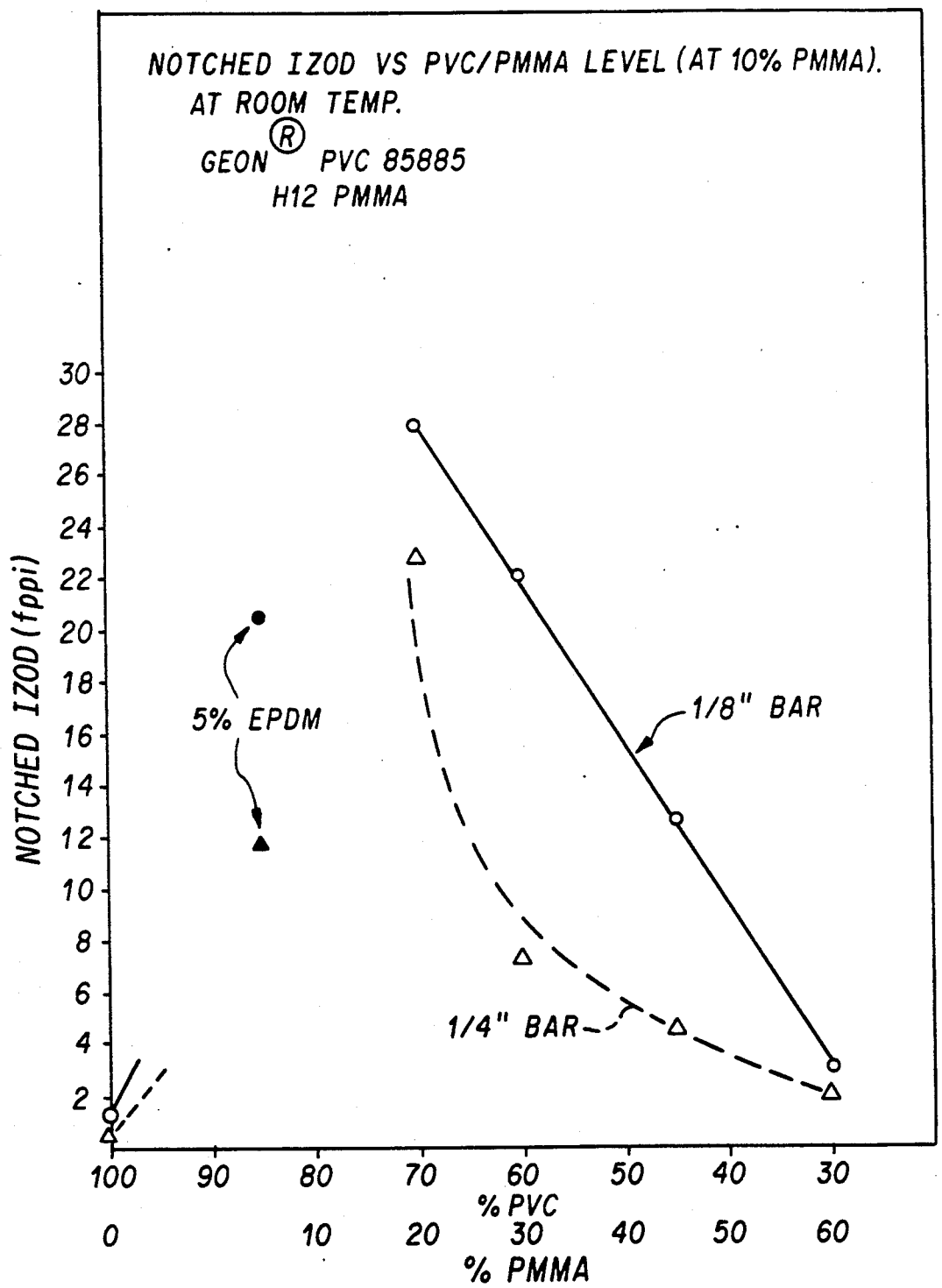
FIG. 14 is a graph of notched Izod impact (at room temperature) versus relative percentage of PVC and PMMA in various blends according to the invention.

Notched Izods increase dramatically over PVC alone and climb to 28 fppi at 70% PVC, the maximum PVC one can add at 10% rubber with our current EPDM graft, (see FIG. 14). In terms of practical impact, these blends also exhibit significant improvement over PVC, i.e., 60% to 90% higher Gardner impact. Contrary to notched Izod, there is no linear relationship between Gardner impact and PVC level.

Figure 15:
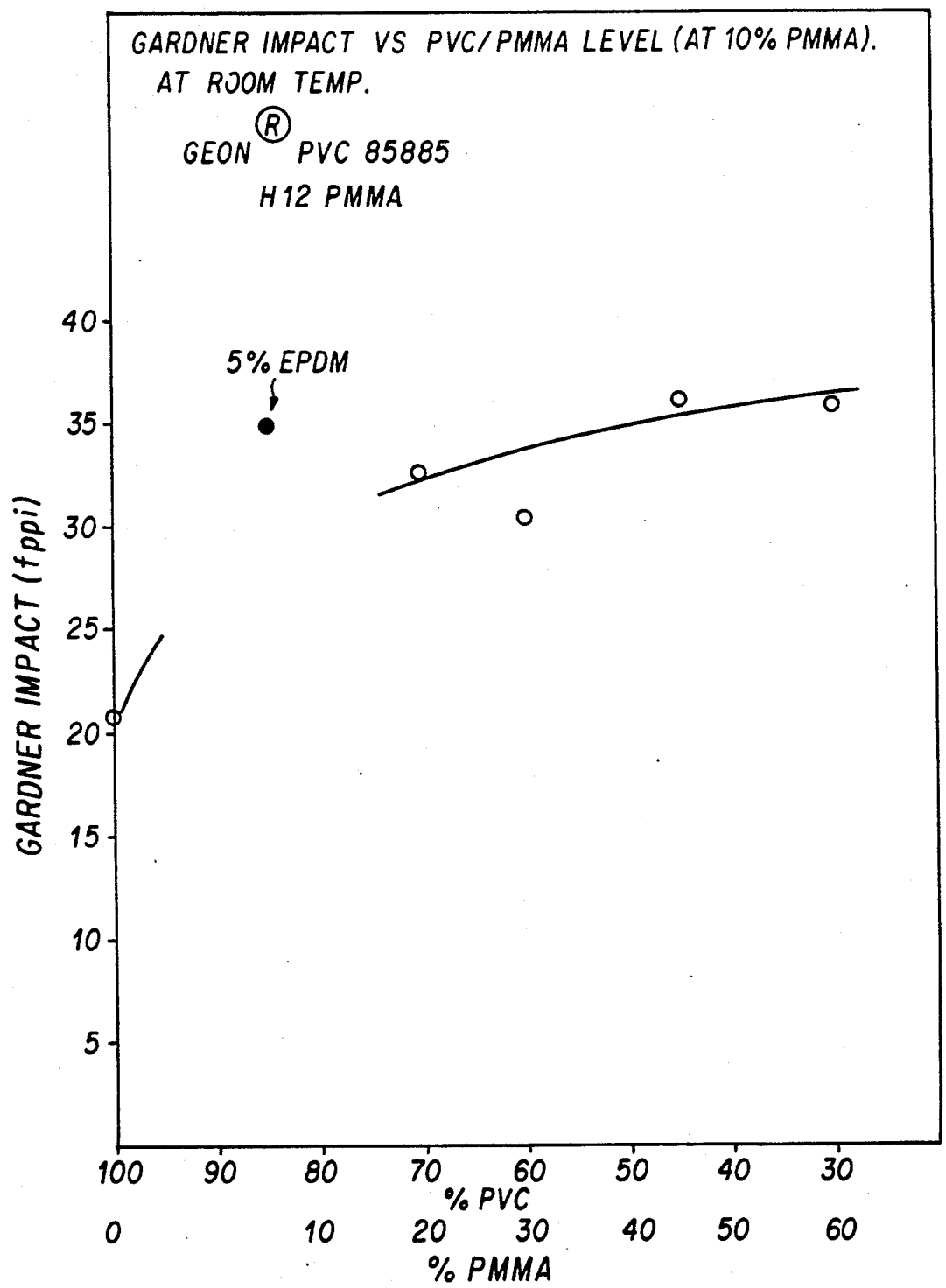
FIG. 15 is a graph of Gardner impact versus relative percentages of PVC and PMMA in various blends according to the invention.
Figure 16:
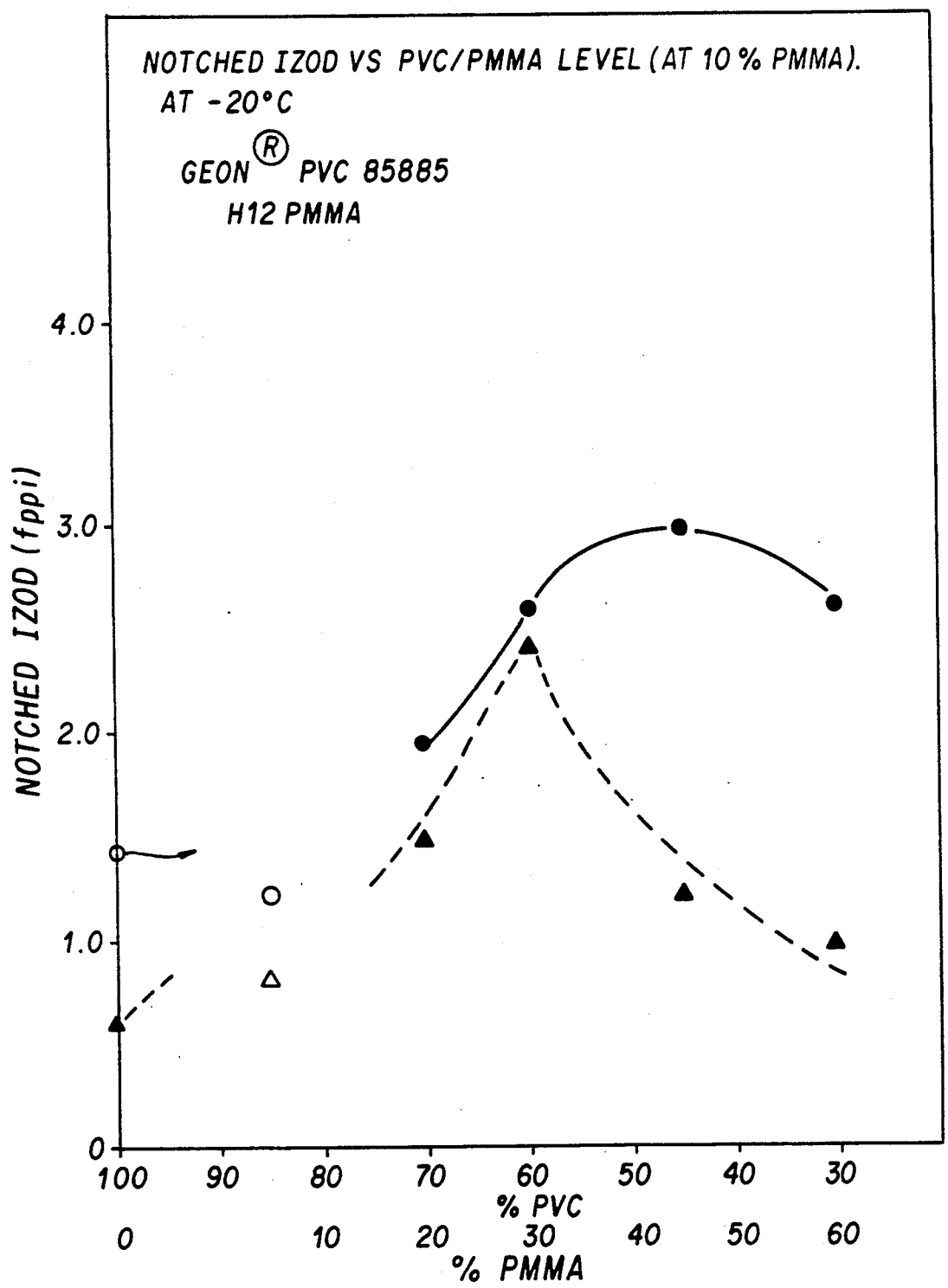
FIG. 16 is a graph of notched Izod impact versus relative percentages of PVC and PMMA in various blends according to the invention.
Figure 17:
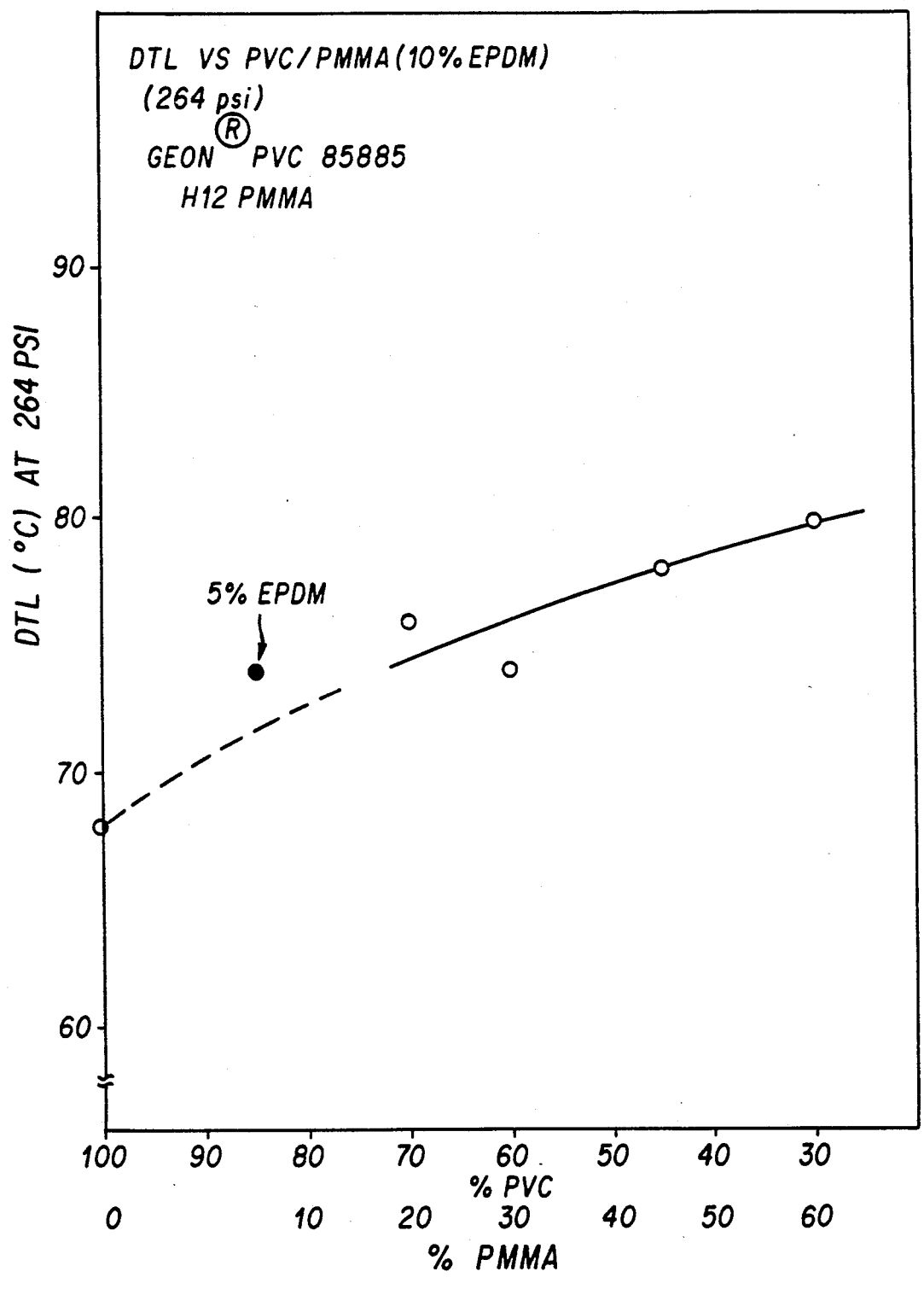
FIG. 17 is a graph of DTL versus relative percentages of PVC and PMMA in various blends according to the invention.

A small decrease in practical impact actually occurs at higher levels of PVC, FIG. 15 At cold temperatures (−20° C.), these blends also exhibit enhanced notched Izod impact over PVC though the improvement is smaller (2-3 fold) than at room temperature, (see FIG. 16). In terms of DTL @264 psi, a very important property in exterior applications, significant increases (6° C. to 12° C.) are obtained in the range of 70% to 30% PVC (see FIG. 17). Mechanical properties such as tensile strength, modulus, elongation at break decrease compared to PVC alone but the blends show little difference as a function of PVC level. Hardness decreases with lowered PVC levels.

Another approach to PVC modification is using our EPDM/PMMA as a modifier. Addition of 15% EPDM modifier (i.e., 5% rubber, 10% PMMA) is shown in Table 12. The results show a dramatic increase in notched Izod impact (at room temperature) as well as a significant increase in practical impact over PVC alone. Interestingly, even at this relatively low level of modifier, the DTL at 264 psi appears to be significantly increased (by 6° C.). Tensile strength, flexural strength, and modulus are reduced by approximately 20%.

TABLE 12

| | | | | | | | | |
|---|---|---|---|---|---|---|---|---|
| | | | Key Properties vs PVC/PMMA Level | | | | | |
| Example No. | COMPOSITION | TENSILE STRENGTH (psi) | ELONGATION % YIELD | ELONGATION % BREAK | TENSILE MODULUS (psi) 10⁶ | FLEXURAL STRENGTH (psi) | FLEXURAL MODULUS (psi) 10⁶ | DTL @ 264 psi °C. | Vicat °C. |
| 78 | Geon ® PVC 85885 | 9,500 | 3.7 | 50 | 0.42 | 14,100 | 0.45 | 68 | 98 |
| | PVC/PMMA/TCP | | | | | | | | |
| 77 | 30/60/10 | 7,600 | 3.9 | 35 | 0.32 | 10,800 | 0.33 | 80 | 99 |
| 76 | 45/45/10 | 7,100 | 3.8 | 41 | 0.32 | 10,300 | 0.32 | 78 | 98 |
| 75 | 60/30/10 | 6,900 | 3.7 | 43 | 0.32 | 10,100 | 0.33 | 74 | 90 |
| 89 | 70/20/10 | 6,700 | 3.7 | 28 | 0.31 | 9,500 | 0.31 | 76 | 93 |
| 90 | 85/10/5 | 7,700 | 3.4 | 15 | 0.36 | 11,000 | 0.37 | 74 | 90 |

| Example No. | COMPOSITION | Rockwell Hardness (M) | Gloss (60°) | NOTCHED IZOD (fppi) Rm Temp ½" | NOTCHED IZOD (fppi) Rm Temp ⅛" | NOTCHED IZOD (fppi) −20° C. ½" | NOTCHED IZOD (fppi) −20° C. ⅛" | CHARPY (fppi) | GARDNER (fppi) |
|---|---|---|---|---|---|---|---|---|---|
| 78 | Geon ® PVC 85885 | 31 | 88 | 0.6 | 1.2 | 0.6 | 1.4 | 30.8 | 21 |
| | PVC/PMMA/TCP | | | | | | | | |
| 77 | 30/60/10 | 46 | 45 | 2.2 | 3.2 | 1.1 | 2.8 | 28.4 | 38 |
| 76 | 45/45/10 | 33 | 35 | 4.5 | 12.7 | 1.3 | 3.0 | 30.8 | 38 |
| 75 | 60/30/10 | 14 | 49 | 7.6 | 22.3 | 2.5 | 2.7 | 31 | 32 |
| 89 | 70/20/10 | — | — | 23.2 | 28.0 | 1.5 | 1.9 | — | 33 |
| 90 | 85/10/5 | — | — | 11.9 | 20.5 | 0.9 | 1.2 | — | 35 |

It will thus be seen that the objects set forth above among those made apparent from the preceding description are efficiently attained, and since certain changes may be made in carrying out the above methods, and in the above compositions and products, without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in the claims ingredients or compounds recited in the singular are intended to include compatible mixtures of such ingredients wherever the sense permits. The adjective "about" before a range is intended to apply to both the upper and the lower limits.

Having described our invention, what we claim as new and desire to secure by Letters Patent is:

1. A polymer blend comprising:
   A. polycarbonate polymer;
   B. a non-nitrogenous grafted, EPDM or EPTM wherein the graft monomers are selected from the group consisting of styrene, acrylates and mixtures thereof;
   C. at least about 19% of the blend being a non-nitrogeneous, single phase polyacrylate polymer.

2. The polymer blend of claim 1 wherein said grafted rubber comprises at least one acrylate, and said acrylate comprises at least about 70%, by weight, of the graft monomers.

3. The polymer blend of claim 2 wherein the graft monomers comprise styrene and methyl methacrylate and the methyl methacrylate comprises at least about 70% by weight of the total amount of styrene and methylmethacrylate.

4. A polymer blend as defined in claim 1 wherein said highly saturated rubber is ethylene-propylene-diene.

5. A polymer blend as defined in claim 1 wherein said polyacrylate polymer comprises up to approximately 45% by weight of said blend.

6. A polymer blend as defined in claim 1 wherein said grafted rubber comprises, apart from solvent, by weight percent
   a) about 15 to 60% of said rubber; and,
   b) about 25 to 80% of acrylate monomer units of the structure

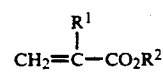

where R¹ is selected from the group consisting of H, an alkyl group, and an aryl group, and R² is selected from the group consisting of an alkyl group, and an aryl group, said groups each comprising less than about 9 carbon atoms;
wherein greater than about 10% of said monomer units are present in the form of polymer chains grafted to said rubber and less than about 90% of said monomer units are not grafted to said rubber.

7. A polymer blend as defined in claim 1, wherein said polyacrylate polymers comprises greater than about 90% of monomer units of the structure

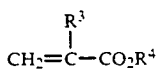

wherein $R^3$ is selected from the group consisting of H, and an alkyl group, and $R^4$ is selected from the group consisting of an alkyl group, and an aryl group, said alkyl groups comprising less than about 9 carbon atoms.

8. A polymer blend as defined in claim 1 wherein said grafted rubber comprises, apart from solvent, by weight percent
a) from about 15 to 60% of said rubber; and,
b) about 25 to 80% of acrylate monomer units of the structure

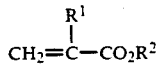

where $R^1$ is selected from the group consisting of H, an alkyl group, and an aryl group, and $R^2$ is selected from the group consisting of an alkyl group, and an aryl group, said groups each comprising less than about 9 carbon atoms;
wherein a portion of said monomer units are present in the form of polymer chains grafted to said rubber, said chains having a number average molecular weight less than about 80,000 daltons.

9. A polymer blend as defined in claim 1 wherein said graft rubber comprises, apart from solvent, by weight percent
A) about 15 to 60% of rubber; and
B) about 25 to 80% of acrylate monomer units of the structure

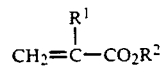

where $R^1$ is selected from the group consisting of H, an alkyl group, and an aryl group, and $R^2$ is selected from the group consisting of an alkyl group, and an aryl group, said groups comprising less than about 9 carbon atoms;
said composition comprising two amorphous, heterogeneously dispersed phases in which greater than about 20% of said monomer units are present in the first phase in the form of polymer chains grafted to the rubber and less than about 80% of the monomer units are present in the second phase and are not grafted to the rubber.

* * * * *